(12) United States Patent
Stock et al.

(10) Patent No.: US 12,401,530 B2
(45) Date of Patent: Aug. 26, 2025

(54) SYSTEMS AND METHODS FOR MODIFYING PENDING BLOCKCHAIN OPERATIONS

(71) Applicant: Coinbase, Inc., Oakland, CA (US)

(72) Inventors: Spencer Stock, Oakland, CA (US); Mansi Prakash, Oakland, CA (US); Sid Coelho-Prabhu, Oakland, CA (US); Chia Hsieh, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 657 days.

(21) Appl. No.: 17/811,095

(22) Filed: Jul. 7, 2022

(65) Prior Publication Data
US 2024/0015035 A1     Jan. 11, 2024

(51) Int. Cl.
*H04L 9/00* (2022.01)
*H04L 9/08* (2006.01)

(52) U.S. Cl.
CPC ............ *H04L 9/50* (2022.05); *H04L 9/0894* (2013.01)

(58) Field of Classification Search
CPC ...................................................... H04L 9/0894
USPC ......................................................... 713/150
See application file for complete search history.

(56) References Cited

U.S. PATENT DOCUMENTS

2024/0281476 A1\* 8/2024 Patt ........................ G06F 16/134
2024/0305482 A1\* 9/2024 Patt ........................ G06F 16/134

\* cited by examiner

*Primary Examiner* — Hee Soo Kim
(74) *Attorney, Agent, or Firm* — Foley & Lardner LLP

(57) ABSTRACT

Methods and systems for a processing architecture that maintains a separate logic pathway corresponding to a first operation type and a second operation type, until a blockchain operation is submitted to the blockchain network using either the first operation type or a second operation type. Following submission of the blockchain operation to the blockchain network, the architecture collapses the parallel logic pathways to a single logical pathway for both types.

20 Claims, 16 Drawing Sheets

SYSTEMS AND METHODS FOR MODIFYING PENDING BLOCKCHAIN OPERATIONS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for novel uses and/or improvements to blockchains and blockchain technology that use a proof-of-stake consensus mechanism.

Proof-of-stake is a type of consensus mechanism that may be used by a blockchain network to achieve distributed consensus and thus avoid a centralized authority. The benefits of proof-of-stake (e.g., as compared to a proof-of-work consensus mechanism) includes better energy efficiency and lower barriers of entry, which may lead to a larger overall node network (as mining blocks in both less costly due to energy efficiency and does not require specialized hardware). For example, unlike a proof-of-work consensus mechanism, the blockchain network does not rely on mining new blocks based on exercising significant amounts of computational power. Instead, validators for the proof-of-stake consensus mechanism are chosen at random based on meeting a threshold staking requirement. Validators then receive rewards for proposing new blocks and for attesting to ones that they have viewed. In contrast, validators may lose their stake for attesting to incorrect or malicious blocks.

Within this context, conventional consensus mechanisms rely on a first-price auction as main gas fee calculation methodology. For example, in first-price auctions, users may set an amount of gas that the user will pay to have their blockchain operation processed. In such cases, the users with the highest amounts will have their blockchain operations processed first (as the validators chose the blockchain operations with the highest gas fee, which in turn became their reward). In contrast to this, methods and systems described herein relate to a new gas fee calculation (e.g., based on a new blockchain operation type) that may allot a dynamic "base fee," which is burned, and an additional fee that is allocated to the validator. While the new gas fee calculation may make the gas fee calculation more transparent and may allow for gas fees to be better estimated, implementation of the new gas fee calculation presents several technical challenges. For example, Ethereum Improvement Proposal (EIP) 1559 will introduce a new blockchain operation type (e.g., a transaction based on a new EIP-2718 transaction envelope type). The EIP-2718 transaction envelope type allows for the use of transaction pricing mechanism that includes fixed-per-block portion of the network fee (e.g., the base fee) that is burned and dynamically expands/contracts block sizes to deal with transient congestion as opposed to the first-price action.

A first technical challenge to be overcome is how client devices will process blockchain operations that use both legacy gas fee calculation and the new gas fee calculation using the same wallet application. An initial technical hurdle to overcome with respect to enabling a new operation type (e.g., a gas fee calculated based on the transaction pricing) for use with blockchain operations is to ensure that clients that use the new operation type are backward compatible with any legacy operation types (e.g., a gas fee calculated based on a prior transaction pricing such as the first-price auction). For example, the new operation type involves the use of a new format for transaction requests that includes new categories of data that are processed by the protocol itself. Thus, any client device needs to discern the operation type of a blockchain operation as well as ensure that the blockchain operation may still be processed by the protocol. One such existing client device may include a wallet application for conducting blockchain operations.

One solution to ensuring that existing systems are backward compatible for the operation type is to reformat all transaction requests for blockchain operations into legacy operation type prior to processing. Alternatively, the system may reformat all requests (e.g., irrespective of what operation type is used) into a standardized operations type in order to allow the existing client systems to process the request. However, such solutions add an additional burden to the client device and require the client device to maintain strict adherence to the formatting (and reformatting) requirements of multiple operation types to ensure that the protocol may process reformatted requests. By doing so, the client device is at risk of overloading its core logical component's handling of the blockchain operation data (e.g., transaction data) and thus increasing the likelihood of a failure.

In contrast to these potential solutions, the methods and systems describe a novel architecture for clients, and in particular wallet applications, to handle new operation types as well as ensure backward compatibility. In particular, the architecture creates parallel logic pathways for legacy and for new operation types (e.g., EIP-1599 transactions). However, creating parallel logic pathways create a novel problem in that the multiple blockchain operations may be submitted to a blockchain network. While such an approach would not be detrimental if the underlying blockchain operations (e.g., transactions performed using either operation type) were kept separate and monitored on different blockchain networks, blockchain operations on a blockchain network are not structured this way. Furthermore, maintaining separate blockchain networks would prevent the backward compatibility needed.

To overcome this novel technical problem, the novel architecture maintains a separate logic pathway corresponding to a first operation type and a second operation type, until a blockchain operation is submitted to the blockchain network using either the first operation type or a second operation type. Following submission of the blockchain operation to the blockchain network, the novel architecture collapses the parallel logic pathways to a single logical pathway for both types.

In some aspects, systems and methods for processing blockchain operations featuring a plurality of blockchain operation types in cryptography-based, storage applications used for decentralized applications are described. For example, the system may receive, at a first user device, a first user request to execute a first blockchain operation using a first cryptography-based, storage application. The system may, in response to receiving the first user request, determine that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. The system may, in response to determining that the first blockchain operation corresponds to the first blockchain operation type, process the first blockchain operation using a first logic pathway of a plurality of logic pathways for the first cryptography-based, storage application, wherein the plurality of logic pathways comprise respective logic pathways for processing blockchain operations having different blockchain operation types. The system may, in response to processing the first blockchain operation using the first logic pathway, submit the first blockchain operation to a blockchain network corresponding to the first blockchain operation. The system may, in response to submitting the first blockchain operation to the blockchain network, process the first blockchain operation using a combined logic pathway, wherein the combined logic pathway comprises a single logic pathway for processing blockchain operations having different blockchain operation types.

A second technical challenge to be overcome is how to determine a dynamic gas range for a blockchain operation using the new gas fee calculation. For example, the new operation type is aimed to be backward compatible with any legacy operation types (e.g., a gas fee calculated based on a prior transaction pricing). In this environment, an initial technical hurdle to overcome with respect to conducting blockchain operations is how to estimate a potential gas fee for blockchain operations given that the environment features both the new blockchain operation type as well as one or more legacy blockchain operation types. For example, practical applications that are used for conducting blockchain operations (e.g., wallet applications) are required to provide an estimate of the gas fees in this mixed environment.

One solution to ensuring that existing systems are able to provide an estimate of the gas fees in this mixed environment is to provide an initial estimated fee as well as a maximum fee. For example, the estimated fee may be based on static characteristics of a given blockchain operation (e.g., a transaction amount) and a maximum fee for any given state of the blockchain network (e.g., a state at a maximum congestion). While the maximum fee ensures that users may anticipate any fees in excess of the estimate, the use of static estimates in a dynamic environment (e.g., an environment where the characteristics of the blockchain network are continually changing) leads to a reduced user experience as the estimates are frequently incorrect and do not inform users of a true cost.

In contrast, the methods and systems described herein use a dynamic approach that provides a range of gas fee estimates. For example, the range of gas fees accounts for the uncertainty in the continually changing blockchain network characteristics. However, creating a dynamic range of gas fee estimates creates a novel problem in how to estimate the dynamic gas range. For example, determining a dynamic gas range based on the blockchain network involves analyzing data across many layers, features, front-end systems, back-end systems, libraries, and/or channels. Additionally, determining dynamic range of gas fee estimates based on a given blockchain operations involves retrieving specific transaction details for the blockchain operation. In view of the variables, the methods and systems use a two-tier process for determining a dynamic gas range. The use of the two-tier process allows for the system to tirage the copious amounts of data and reduce the overall data processing requirements in generating the dynamic range of gas fee estimates. First, the methods and systems verify that a first set of dynamic data (e.g., max fee set by a user) meets threshold criteria (e.g., a base fee), which the threshold criteria is based on a current state of the blockchain network. In response to verifying that the first set of dynamic data meets first threshold criteria, the system verifies that a second set of dynamic data (e.g., a max fee and/or priority fee) meets second threshold criteria (e.g., a base fee plus the miner's fee corresponding to a selected priority). In response to verifying that the second set of dynamic data meets second threshold criteria, the methods and systems generate dynamic range of gas fee estimates based on the received dynamic data. The dynamic range of gas fee estimates may then be determined based on a lowerbound of the first dynamic gas range that is based on the second threshold criteria and a fourth dynamic blockchain operation characteristic (e.g., based on a current network congestion) and an upperbound that is based on the first set of dynamic data (e.g., max fee set by a user).

In some aspects, systems and methods for determining dynamic gas range for blockchain operations using a two-tier approach in cryptography-based, storage applications used for decentralized applications are described. For example, the system may receive, at a first user device, a first user request to execute a blockchain operation using a first cryptography-based, storage application. The system may, in response to receiving the first user request, determine a first static blockchain operation characteristic for the blockchain operation, wherein the first static blockchain operation characteristic is based on a first user input. The system may compare the first static blockchain operation characteristic to a first threshold criterion to determine whether the first static blockchain operation characteristic equals or exceeds the first threshold criterion. The system may, in response to determining that the first static blockchain operation characteristic equals or exceeds the first threshold criterion, determine a second static blockchain operation characteristic for the blockchain operation, wherein the second static blockchain operation characteristic is based on a second user input. The system may determine a third static blockchain operation characteristic for the blockchain operation based on the second static blockchain operation characteristic. The system may determine a second threshold criterion based on a sum of the third static blockchain operation characteristic and the first threshold criterion. The system may compare the first static blockchain operation characteristic to the second threshold criterion to determine whether the first static blockchain operation characteristic exceeds the second threshold criterion. The system may, in response to determining that the first static blockchain operation characteristic exceeds the second threshold criterion, determine a first dynamic gas range for the blockchain operation, wherein a lowerbound of the first dynamic gas range is based on the second threshold criterion and a fourth dynamic blockchain operation characteristic, wherein the fourth dynamic blockchain operation characteristic is based on a current state of the blockchain network. The system may generate for display, in a user interface, the first dynamic gas range for the blockchain operation.

A third technical challenge to be overcome is how to determine the bounds of dynamic gas range for blockchain operations using the new gas fee calculation while still determining the blockchain characteristics required for new operation types (e.g., EIP-1599 transactions). For example, even after providing a dynamic gas fee range (as opposed to a static estimate), the system still needs to determine what blockchain operation characteristics to use to determine the dynamic gas range. Additionally or alternatively, the system also needs to determine how to integrate the ability to set different priorities (e.g., priority designations) for different blockchain operations within the dynamic gas fee range.

One solution for integrating the different priorities (e.g., priority designations) for different blockchain operations within the dynamic gas fee range would be to determine the various different blockchain operation characteristics for each priority and generate a dynamic gas fee with the highest upperbound and lowest lowerbound based on the various combinations of the different blockchain operation characteristics. However, such an approach leads to such a large range of values that the dynamic gas fee is unhelpful to users. Furthermore, the use of a combined dynamic gas fee is not helpful in distinguishing which blockchain operation characteristics correlate to range of the dynamic gas fee. Another approach would be to allow a user to enter various blockchain operation characteristics (and/or ranges for those blockchain operation characteristics). While this approach provides additional user control, this approach may reduce the seamlessness of the blockchain operations.

To overcome these novel technical problems related to the development of dynamic gas fees, the methods and systems described herein rely on an application programming interface (API) for a decentralized application to select types of blockchain operation characteristics to set as static blockchain operation characteristics during a given blockchain operation (e.g., priority designations) and generate respective dynamic gas ranges based on a common dynamic blockchain operation characteristic. Notably, while the type of static blockchain operation characteristics selected may be static in that the user may not modify a value assigned by the API and that it is not directly related to a current state of the blockchain chain, the API may nonetheless determine a plurality of values for the static blockchain operation characteristic. The API may then match each of the values of the plurality of values to a common dynamic blockchain operation characteristic (e.g., a base fee) to generate a plurality of blockchain operation processing recommendations (e.g., recommendations indicating a dynamic gas range corresponding to a plurality of priority designations).

In some aspects, methods and systems are described for facilitating blockchain operation characteristic selection when conducting blockchain operations using cryptography-based, storage applications. For example, the system may receive a first user request to perform a blockchain operation, of a plurality of blockchain operations, corresponding to a first cryptography-based, storage application. The system may determine, based on a first function, a first type of blockchain operation characteristics of a plurality of blockchain operation characteristics for generating a plurality of respective values for static blockchain operation characteristics for a plurality of blockchain operation processing recommendations, wherein each of the plurality of blockchain operation processing recommendations corresponds to a respective dynamic gas range of a plurality of dynamic gas ranges. The system may generate the plurality of respective values for the first type of blockchain operation characteristics. The system may determine a dynamic blockchain operation characteristic based on a current state of a blockchain network. The system may generate a first dynamic gas range of the plurality of dynamic gas ranges by combining the dynamic blockchain operation characteristic with a first value of the plurality of respective values for the first type of blockchain operation characteristics. The system may generate a second dynamic gas range of the plurality of dynamic gas ranges by combining the dynamic blockchain operation characteristic with a second value of the plurality of respective values for the first type of blockchain operation characteristics. The system may generate for display, on a user interface, a first blockchain operation processing recommendation, of the plurality of blockchain operation processing recommendations, based on the first dynamic gas range. The system may generate for display, on the user interface, a second blockchain operation processing recommendation, of the plurality of blockchain operation processing recommendations, based on the second dynamic gas range. The system may receive a user input corresponding to the first blockchain operation processing recommendation. The system may, in response to the user input, process the blockchain operation based on the first value.

A fourth technical challenge is how to generate cancelation and priority changes in blockchain operations. For example, while the new transaction pricing mechanism may ultimately lower network congestion and transaction costs, the new transaction pricing mechanism also introduces a new time delay and timing mechanic. Specifically, as opposed to submitting a blockchain operation to a blockchain network and waiting for acceptance of the blockchain operation, EIP-1599 introduces a blockchain operation type that allows a user to select a priority for the blockchain operation, in which the priority selected by the user influences how quickly the blockchain operation is conducted.

However, this mechanic raises a novel technical problem. For example, users will undoubtably submit blockchain operations and, while waiting for the blockchain operation (e.g., due to the newly introduced time delay), wish to edit the blockchain operation. For example, users may wish to cancel the operation or edit the priority previously selected (e.g., to speed up an operation). This issue is particularly notable given the immutable nature of blockchain operations (i.e., once the blockchain operation occurs, it cannot be reversed).

In view of this technical limitation, methods and systems are described herein for a decentralized application that facilitate pending transactions to be modified within the constraints of the blockchain protocol. Specifically, the methods and systems may allow users to edit the priority of pending blockchain operations and/or cancel pending blockchain operations by mimicking the pending blockchain operation while editing key blockchain operation characteristics of the pending blockchain operation in order to have the pending blockchain operation replaced with a new blockchain operation that contains the same transaction details. In particular, the decentralized application uses a processing workflow to replace pending blockchain operations based on editing gas fees while maintaining other blockchain operation characteristics. By doing so, the decentralized application may cancel or edit the priority selected for pending blockchain operations prior to the occurrence of the blockchain operation in the immutable environment of the blockchain network.

In some aspects, systems and methods for modifying pending blockchain operations by mimicking the pending blockchain operations in decentralized applications are described. The system may receive, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic. The system may, while the first blockchain operation is pending, receive, via the user interface of the user device, a second user request to modify the first blockchain operation. The system may, in response to the second user request, determine a first nonce value for the first blockchain operation. The system may identify the first blockchain operation from a plurality of pending blockchain operations based on the first nonce value. The system may, in response to identifying the first blockchain operation, determine a first modification type of a plurality of modification types for the first blockchain operation. The system may select the first type of static blockchain operation characteristic for modification based on the first modification type. The system may determine a third value for the first type of static blockchain operation characteristic. The system may generate a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation. The system may, in response to generating the second blockchain operation, automatically, without further user input, replace the first blockchain operation with the second blockchain operation in the plurality of pending blockchain operations.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
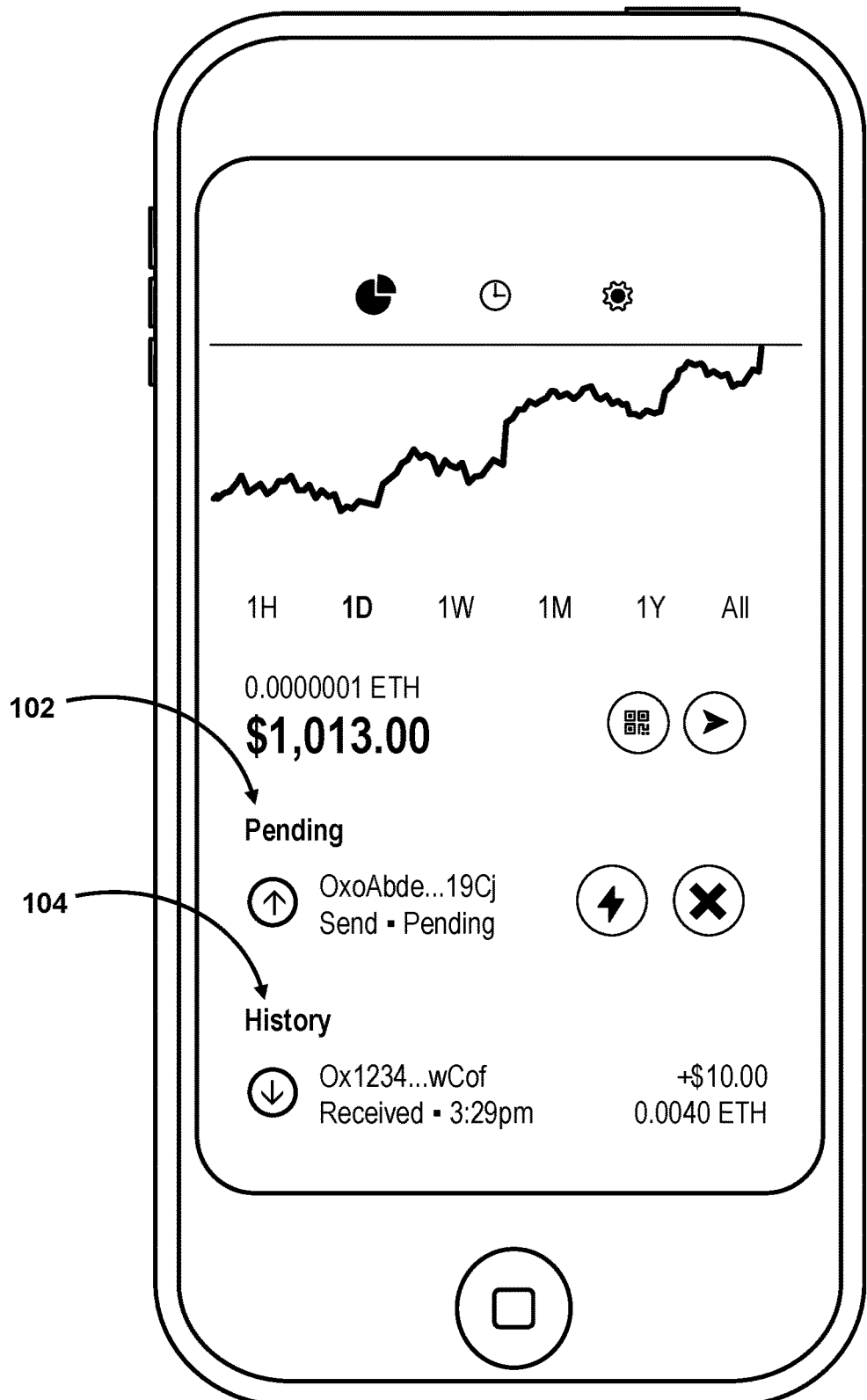
FIGS. 1A-F show illustrative user interfaces related to blockchain operations, in accordance with one or more embodiments.

FIGS. 1A-F show illustrative user interfaces related to blockchain operations, in accordance with one or more embodiments. For example, FIG. 1A shows user interface 100, which may comprise a decentralized application browser used for conducting blockchain operations linked to a cryptography-based, storage application. For example, the decentralized application browser may receive user requests for performing a plurality of blockchain operations across a computer network. In some embodiments, an API implemented on a user device may receive a user request (e.g., from the decentralized application browser) to perform the blockchain operation. As referred to herein, a cryptography-based digital repository or "a cryptography-based, storage application" may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain operations easily and securely without risking the information becoming public or subject to a cyberattack. In some embodiments, user interface 100 may illustrate an open connection between a client (mobile or extension) and a decentralized application.

As previously discussed, EIP-1559 will introduce a new blockchain operation type (e.g., a transaction based on a new EIP-2718 transaction envelope type). The EIP-2718 transaction envelope type allows for the use of transaction pricing mechanism that includes fixed-per-block portion of the network fee (e.g., the base fee) that is burned and dynamically expands/contracts block sizes to deal with transient congestion as opposed to the first-price action. For example, this wrapper around transaction parameters allows nodes and other indexing clients to simplify differentiation between different blockchain operations.

FIGS. 1A-F show illustrative user interfaces related to blockchain operations in this environment, in accordance with one or more embodiments. For example, the methods and system may use unconventional block sizes during operation. The system may, in some embodiments, determine this block size in response to a user request by determining a given protocol (e.g., whether the blockchain operation uses a transaction pricing mechanism or a first-price auction). By doing so, the system may direct requests along a proper logic pathway (e.g., as discussed below in relation to FIG. 7). For example, limitations to block sizes may be enforced by a blockchain network. For example, on the Ethereum network a block size is enforced via a "Gas Limit" for the entire block. Previously protocols (e.g., using first-price auction) set the gas limit to 15 million gas. EIP-1559 doubled the limit to 30 million with a stipulation that the average block size must stay at or very near 15 million. In some embodiments, the system may also monitor this average and/or enforce it algorithmically.

For example, as the size of a block exceeds 15 million, the base fee (e.g., a dynamic blockchain operation characteristic) increases proportionally. For example, if a block is smaller than 15 million, the base fee decreases proportionally. In some embodiments, the system may enforce a 12.5% maximum base fee fluctuation that can take place between any two blocks. By doing so, the system may make the network more resilient to spikes and more gas prices more predictable.

As referred to herein, a "base fee" refers to an amount of cryptocurrency (or other digital asset) that the blockchain burns in order to process a blockchain operation on the blockchain. For example, a base fee may be a minimum amount fee per gas unit needed to include a new blockchain operation in a block. Before EIP-1559, a blockchain network could not enforce a base fee and all miner fees went to the miner. However, with EIP-1559 most fees are burned and the miner is typically left with a very small remainder. The base fee is used to reach an equilibrium with market demand. By doing so, the system may provide a mechanism that is deflationary for ETH and ensures miners cannot opt into non-ETH compensation for blockchain operations (e.g., "gasless transactions").

FIG. 1A includes blockchain operation 102 (e.g., a pending blockchain operation) and blockchain operation 104 (e.g., a completed blockchain operation). As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

For example, before EIP-1559 each blockchain operation (e.g., on the Ethereum network) had a GasPrice set on the blockchain operation. In some blockchain standards, blockchain nodes picked the highest GasPrice transactions to include in the next block. The entire GasPrice was paid directly to the miner, in which GasPaid=GasPrice*GasLimit.

For a legacy blockchain operation on EIP-1559 enabled blockchain (e.g., using a first-price auction), a base fee is required to be included in a block, which is burned by the blockchain network. The system then provides the remainder that is not burned to miners. For EIP-1559 blockchain operations, each blockchain operation includes a MaxFee-PerGas and MaxPriorityFeePerGas. The MaxFeePerGas represents the highest base fee a user is willing to pay to have their transaction mined. The MaxPriorityFee is the maximum amount of the MaxFee that the user is willing to "tip" to miners (assuming it is not all consumed by the base fee). The actual executing gas price is dynamically decided with the following formula, and any excess is returned to the user. GasPaid=Math.min((BaseFee+MaxPriorityFeePerGas)*GasLimit, MaxFeePerGas*GasLimit).

For example, each blockchain operation may include static blockchain operation characteristics and dynamic blockchain operation characteristics. Static blockchain operation characteristics may comprise characteristics for blockchain operations that do not depend on the current state of the blockchain network. For example, a static blockchain operation characteristic may comprise data or values that are set by a user (e.g., via user interface 100). Static blockchain operation characteristics may include blockchain operation user data (e.g., data representing an action from a user including a transfer of funds), a miner fee or priority fee (e.g., the fee required to process a transaction on the blockchain), a maximum priority fee (e.g., a maximum amount of "miner tip" per gas the user is willing to pay directly to the miner for processing the transaction), a user inputted gas limit (e.g., maximum amount of gas units a transaction is allowed to consume), and/or a max fee (e.g., a maximum amount fee per gas user is willing to pay for a transaction, which must be larger than the base fee for the transaction to go through).

In contrast, a dynamic blockchain operation characteristic may comprise a characteristic that is dependent on the current state of the blockchain network. For example, a dynamic blockchain operation characteristic may comprise a gas limit for a block on the blockchain (e.g., a maximum amount of gas units allowed in an entire block), a base fee (e.g., a minimum amount fee per gas unit needed to include a new transaction in a block, which may be set by a protocol algorithmically).

Figure 1B:
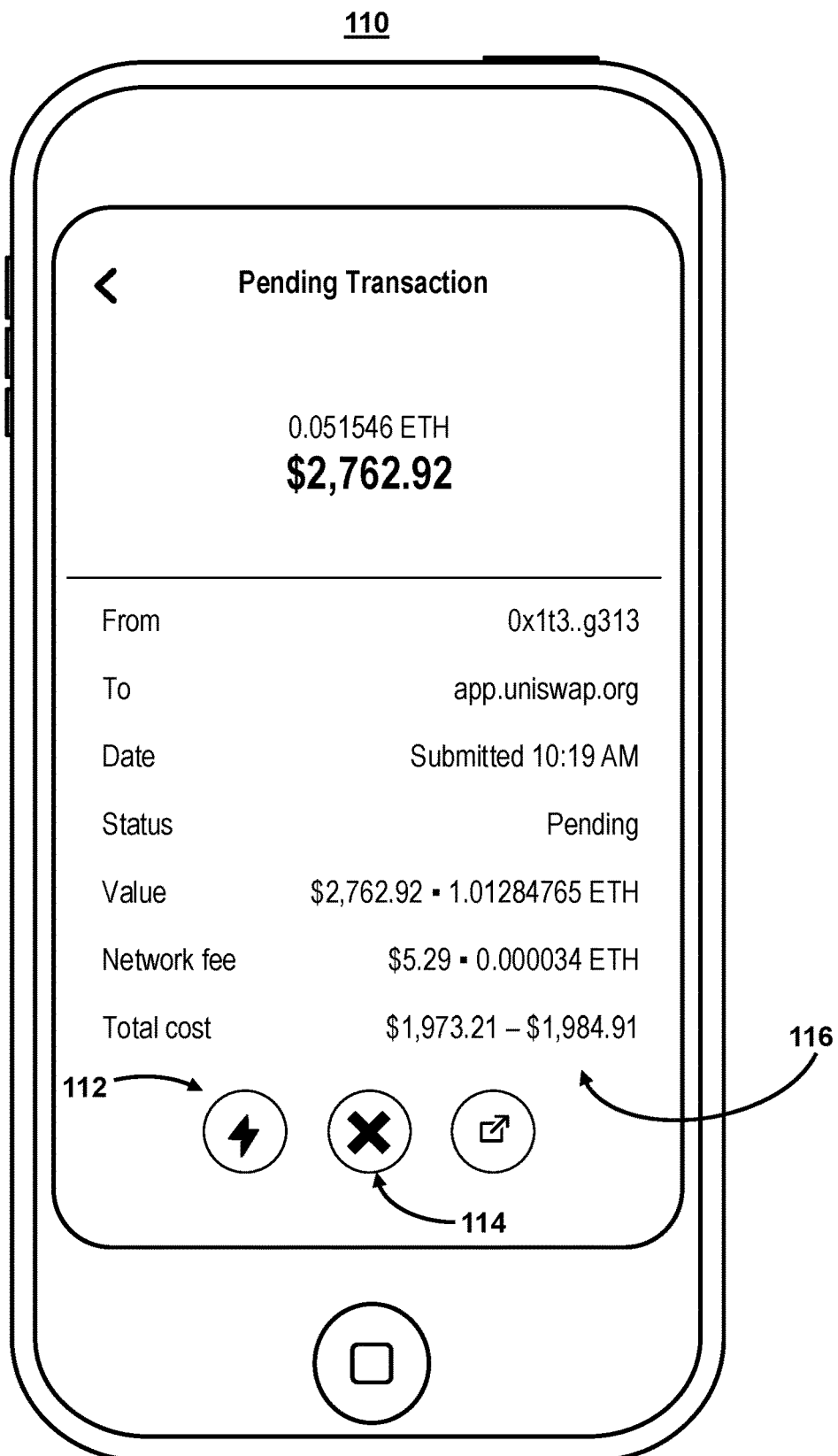

FIG. 1B may illustrate a pending blockchain operation (e.g., blockchain operation 102 (FIG. 1A)) featuring dynamic gas fee range 116. For example, the system may provide a technical solution to how to determine a dynamic gas fee range for a blockchain operation using the new gas fee calculation.

A previously discussed, EIP-1559 will introduce a new blockchain operation type (e.g., a transaction based on a new EIP-2718 transaction envelope type). The EIP-2718 transaction envelope type allows for the use of transaction pricing mechanism that includes fixed-per-block portion of the network fee (e.g., the base fee) that is burned and dynamically expands/contracts block sizes to deal with transient congestion as opposed to the first-price action. For example, this wrapper around transaction parameters allows nodes and other indexing clients to simplify differentiation between different blockchain operations.

For example, the new operation type is aimed to be backward compatible with any legacy operation types (e.g., a gas fee calculated based on a prior first-price auction pricing). In this environment, an initial technical hurdle to overcome with respect to conducting blockchain operations is how to estimate a potential gas fee for blockchain operations given that the environment features both the new blockchain operation type as well as one or more legacy blockchain operation types. For example, a second blockchain operation type may not comprise a first envelope standard (e.g., a Typed Transaction Envelope corresponding to EIP-2178). The second blockchain operation type may comprise a different envelope standard and/or may not comprise any envelope standard.

For example, practical applications that are used for conducting blockchain operations (e.g., wallet applications) are required to provide an estimate of the gas fees in this mixed environment. This determination is further complicated as the system may offer one or more priority designations (e.g., as shown in FIG. 1D). The priority designation (e.g., priority designation 132) may indicate a speed at which the blockchain operation is conducted. In some embodiments, the priority designation may include static blockchain operation characteristics based on a decentralized application setting for a priority fee (e.g., as described in FIG. 6 below). Alternatively or additionally, the system may allow a user to enter a custom setting (e.g., custom setting 134).

One solution to ensuring that existing systems are able to provide an estimate of the gas fees in this mixed environment is to provide an initial estimated fee as well as a maximum fee. For example, the estimated fee may be based on static characteristics of a given blockchain operation (e.g., a transaction amount) and a maximum fee for any given state of the blockchain network (e.g., a state at a maximum congestion). While the maximum fee ensures that users may anticipate any fees in excess of the estimate, the use of static estimates in a dynamic environment (e.g., an environment where the characteristics of the blockchain network are continually changing) leads to a reduced user experience as the estimates are frequently incorrect and do not inform users of a true cost.

In contrast, the methods and systems described herein use a dynamic approach that provides a range of gas fee estimates. For example, the range of gas fees accounts for the uncertainty in the continually changing blockchain network characteristics. However, creating a dynamic range of gas fee estimates creates a novel problem in how to estimate the dynamic gas range. For example, determining a dynamic gas range based on the blockchain network involves analyzing data across many layers, features, front-end systems, back-end systems, libraries, and/or channels. Additionally, determining dynamic range of gas fee estimates based on a given blockchain operations involves retrieving specific transaction details for the blockchain operation. In view of the variables, the methods and systems use a two-tier process for determining a dynamic gas range. The use of the two-tier process allows for the system to tirage the copious amounts of data and reduce the overall data processing requirements in generating the dynamic range of gas fee estimates. First, the methods and systems verify that a first set of dynamic data (e.g., max fee set by a user) meets threshold criteria (e.g., a base fee), which the threshold criteria is based on a current state of the blockchain network. In response to verifying that the first set of dynamic data meets first threshold criteria, the system verifies that a second set of dynamic data (e.g., a max fee and/or priority fee) meets second threshold criteria (e.g., a base fee plus the miner's fee corresponding to a selected priority). In response to verifying that the second set of dynamic data meets second threshold criteria, the methods and systems generate dynamic range of gas fee estimates based on the received dynamic data. The dynamic range of gas fee estimates may then be determined based on a lowerbound of the first dynamic gas range that is based on the second threshold criteria and a fourth dynamic blockchain operation characteristic (e.g., based on a current network congestion) and an upperbound that is based on the first set of dynamic data (e.g., max fee set by a user).

In some embodiments, systems and methods for determining dynamic gas range for blockchain operations using a two-tier approach in cryptography-based, storage applications used for decentralized applications are described. For example, the system may receive, at a first user device, a first user request to execute a blockchain operation using a first cryptography-based, storage application. The system may, in response to receiving the first user request, determine a first static blockchain operation characteristic for the blockchain operation, wherein the first static blockchain operation characteristic is based on a first user input. The system may compare the first static blockchain operation characteristic to a first threshold criterion to determine whether the first static blockchain operation characteristic equals or exceeds the first threshold criterion. The system may, in response to determining that the first static blockchain operation characteristic equals or exceeds the first threshold criterion, determine a second static blockchain operation characteristic for the blockchain operation, wherein the second static blockchain operation characteristic is based on a second user input. The system may determine a third static blockchain operation characteristic for the blockchain operation based on the second static blockchain operation characteristic. The system may determine a second threshold criterion based on a sum of the third static blockchain operation characteristic and the first threshold criterion. The system may compare the first static blockchain operation characteristic to the second threshold criterion to determine whether the first static blockchain operation characteristic exceeds the second threshold criterion. The system may, in response to determining that the first static blockchain operation characteristic exceeds the second threshold criterion, determine a first dynamic gas range for the blockchain operation, wherein a lowerbound of the first dynamic gas range is based on the second threshold criterion and a fourth dynamic blockchain operation characteristic, wherein the fourth dynamic blockchain operation characteristic is based on a current state of the blockchain network. The system may generate for display, in a user interface, the first dynamic gas range for the blockchain operation first dynamic gas range for the blockchain operation.

FIG. 1B may illustrate a pending blockchain operation (e.g., blockchain operation 102 (FIG. 1A)) based on both static and dynamic blockchain operation characteristics. For example, user interface 110 shows a network fee, which is based on a base fee, which is a dynamic blockchain operation characteristic, and priority designation, which is a static blockchain operation characteristic. User interface 110 also includes icon 112 for modifying the priority of the pending blockchain operation as well as icon 114 for canceling the pending blockchain operation.

For example, the system may also determine how to generate cancelation and priority changes in blockchain operations. For example, while the new transaction pricing mechanism may ultimately lower network congestion and transaction costs, the new transaction pricing mechanism also introduces a new time delay and timing mechanic. Specifically, as opposed to submitting a blockchain operation to a blockchain network and waiting for acceptance of the blockchain operation, EIP-1599 introduces a blockchain operation type that allows a user to select a priority for the blockchain operation, in which the priority selected by the user influences how quickly the blockchain operation is conducted. For example, in response to a user selection of icon 112, the system may generate user interface 120.

Figure 1C:
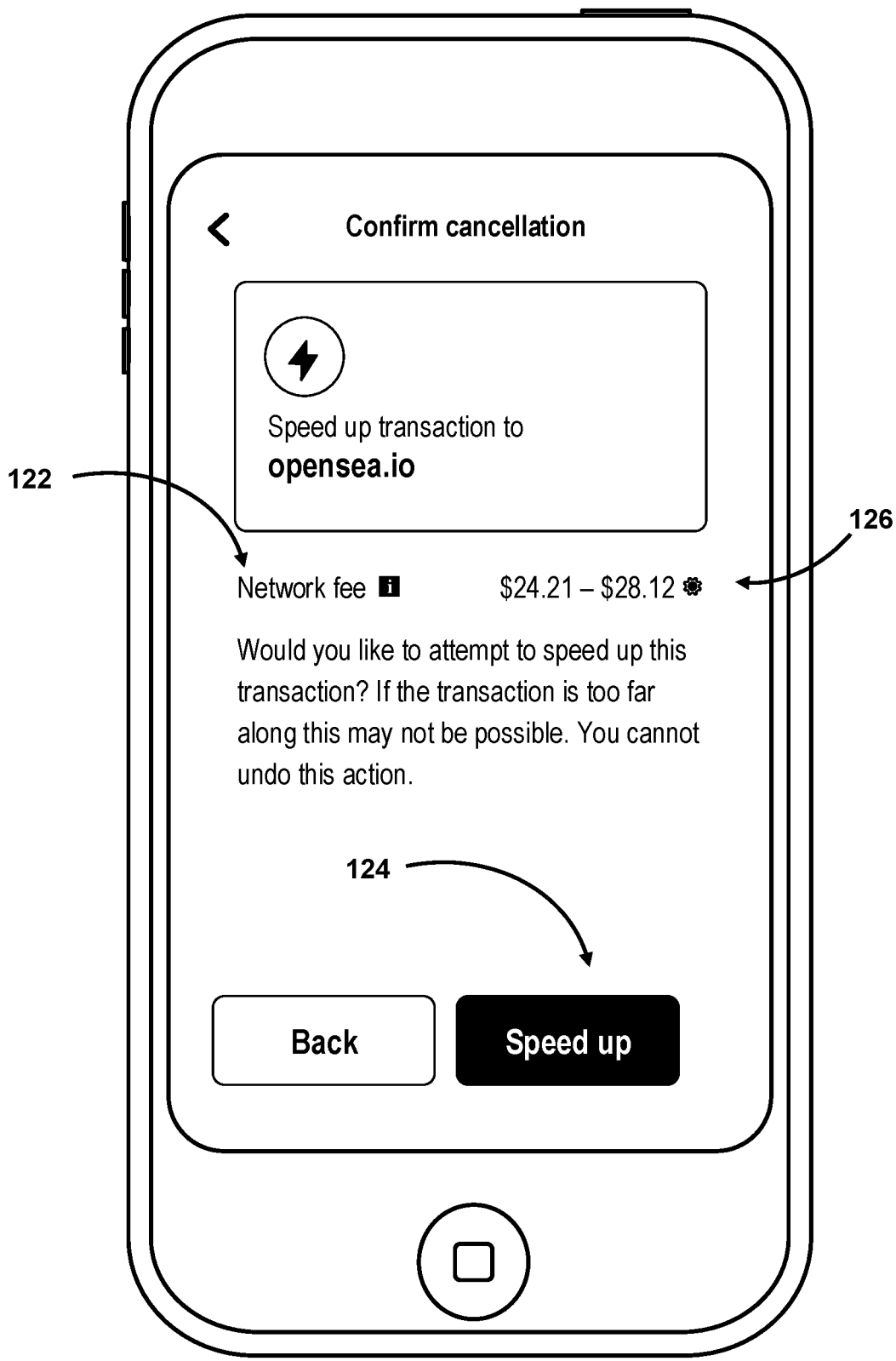
Figure 1D:
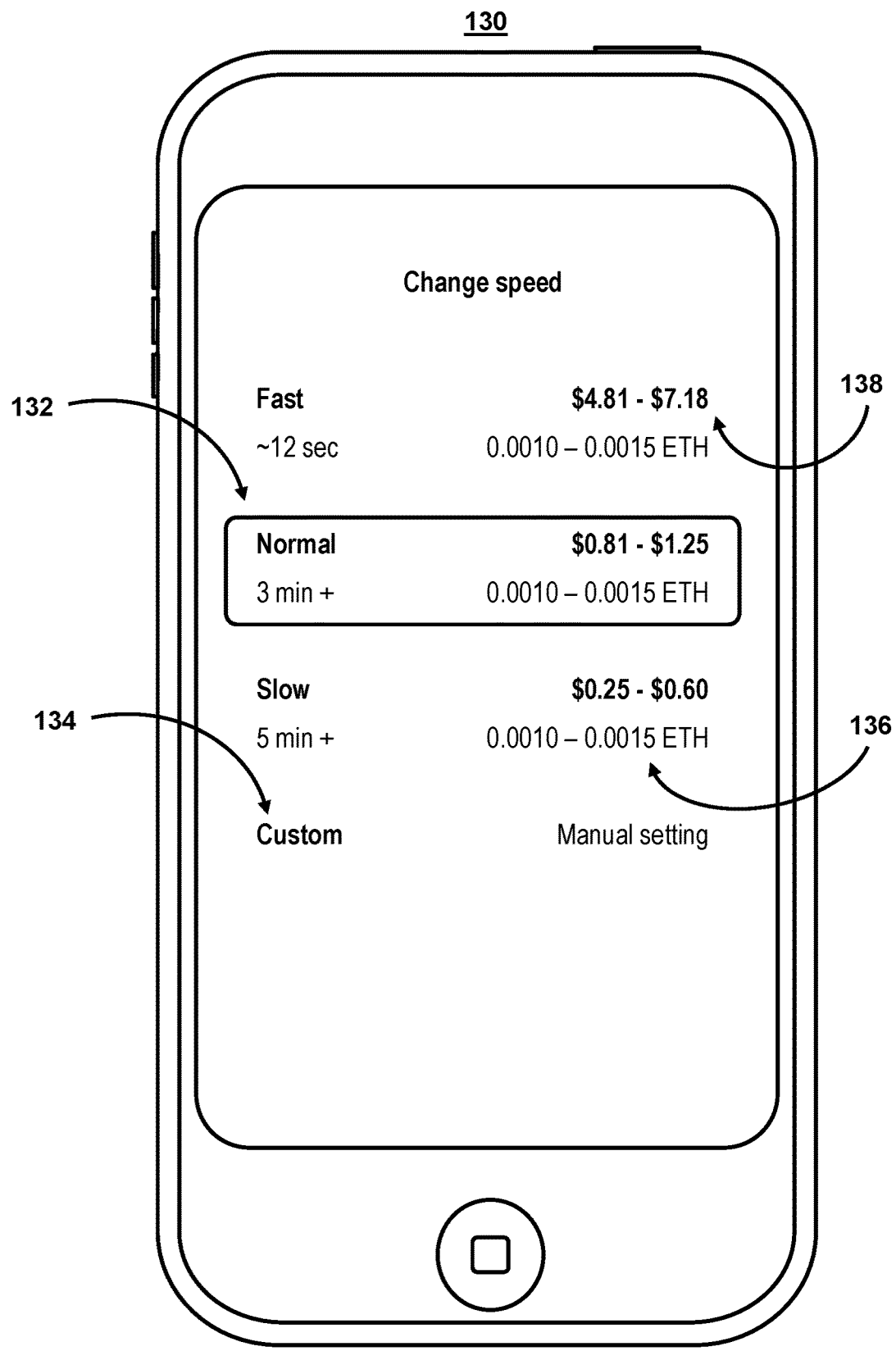

FIG. 1C illustrates user interface 120. User interface 120 includes a network fee (e.g., network fee 122), which is based on a base fee, which is a dynamic blockchain operation characteristic, and priority designation, which is a static blockchain operation characteristic. FIG. 1C also includes dynamic gas range 126. For example, the system may determine dynamic gas range 126 based on the detected static and dynamic blockchain operation characteristics. In order to determine dynamic gas range 126, the system may use a two-tier approach.

However, this mechanic raises a novel technical problem. For example, users will undoubtedly submit blockchain operations and, while waiting for the blockchain operation (e.g., due to the newly introduced time delay), wish to edit the blockchain operation. For example, users may wish to cancel the operation or edit the priority previously selected (e.g., to speed up an operation). This issue is particularly notable given the immutable nature of blockchain operations (i.e., once the blockchain operation occurs it cannot be reversed). For example, user interface 120 includes icon 124 for speeding up the rate at which a blockchain operation (e.g., pending blockchain operation 102 (FIG. 1A)) is completed.

FIG. 1D illustrates user interface 130. For example, in response to selecting to speed up a blockchain operation (e.g., via selecting icon 124 (FIG. 1C), the system may offer one or more priority designations (e.g., priority designation 132) as part of one or more blockchain operation processing recommendations (e.g., blockchain operation processing recommendation 138).

Priority designation 132 may indicate a speed at which the blockchain operation is conducted. In some embodiments, the priority designation may include static blockchain operation characteristics based on a decentralized application setting for a priority fee (e.g., as described in FIG. 6 below). For example, the system may determine several values (e.g., corresponding to various priority designations). The system may then use these values to generate the plurality of blockchain operation processing recommendations that correspond to various priorities. Alternatively or additionally, the system may allow a user to enter a custom setting (e.g., custom setting 134).

As shown in user interface 130, the system may generate a dynamic gas range (e.g., dynamic gas range 148) based on the user-inputted static characteristic. To do so, the system may calculate the dynamic gas range based on both the static blockchain operation characteristics as well as dynamic blockchain operation characteristics (e.g., a current base fee that is based on the state of the blockchain network).

Figure 1E:
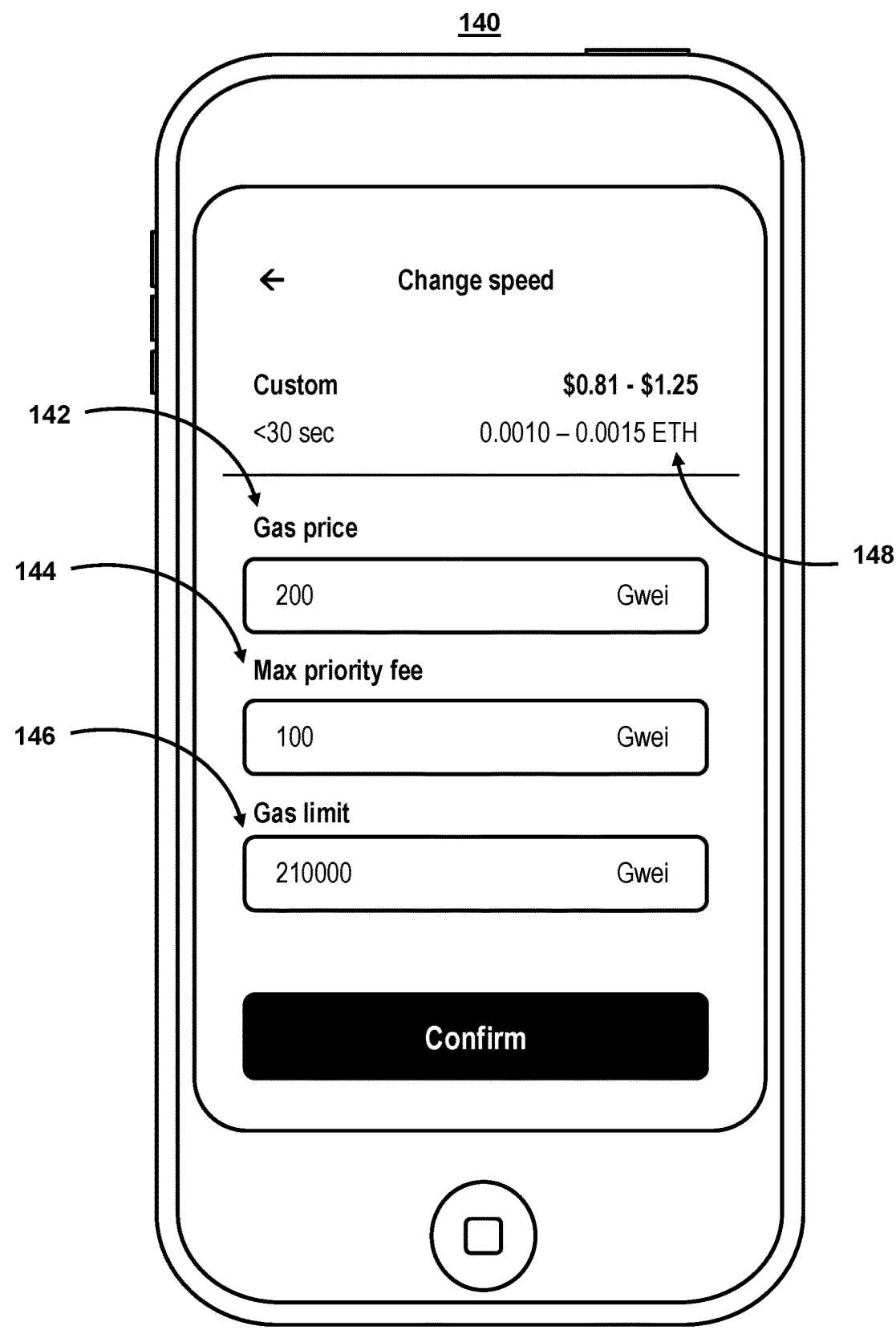

FIG. 1E illustrates user interface 140 where a use may input one or more static blockchain operation characteristics such as a gas price 142 (e.g., a maximum amount fee per gas user is willing to pay for the pending blockchain operation), max priority fee 144 (e.g., a maximum amount of "miner tip" per gas user is willing to pay directly to the miner for processing the blockchain operation), and gas limit 146 (e.g., a maximum amount of gas units a transaction is allowed to consume). The system may then determine an updated dynamic gas range (e.g., dynamic gas range 136) based on the user-inputted static characteristic.

In view of this technical limitation, methods and systems are described herein for a decentralized application that facilitate pending transactions to be modified within the constraints of the blockchain protocol. Specifically, the methods and systems may allow users to edit the priority of pending blockchain operations and/or cancel pending blockchain operations by mimicking the pending blockchain operation while editing key blockchain operation characteristics of the pending blockchain operation in order to have the pending blockchain operation replaced with a new blockchain operation that contains the same transaction details. In particular, the decentralized application uses a processing workflow to replace pending blockchain operations based on editing gas fees while maintaining other blockchain operation characteristics. By doing so, the decentralized application may cancel or edit the priority selected for pending blockchain operations prior to the occurrence of the blockchain operation in the immutable environment of the blockchain network.

For example, systems and methods for modifying pending blockchain operations by mimicking the pending blockchain operations in decentralized applications are described. The system may receive, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic. The system may, while the first blockchain operation is pending, receive, via the user interface of the user device, a second user request to modify the first blockchain operation. The system may, in response to the second user request, determine a first nonce value for the first blockchain operation. The system may identify the first blockchain operation from a plurality of pending blockchain operations based on the first nonce value. The system may, in response to identifying the first blockchain operation, determine a first modification type of a plurality of modification types for the first blockchain operation. The system may select the first type of static blockchain operation characteristic for modification based on the first modification type. The system may determine a third value for the first type of static blockchain operation characteristic. The system may generate a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation. The system may, in response to generating the second blockchain operation, automatically, without further user input, replace the first blockchain operation with the second blockchain operation in the plurality of pending blockchain operations.

Figure 1F:
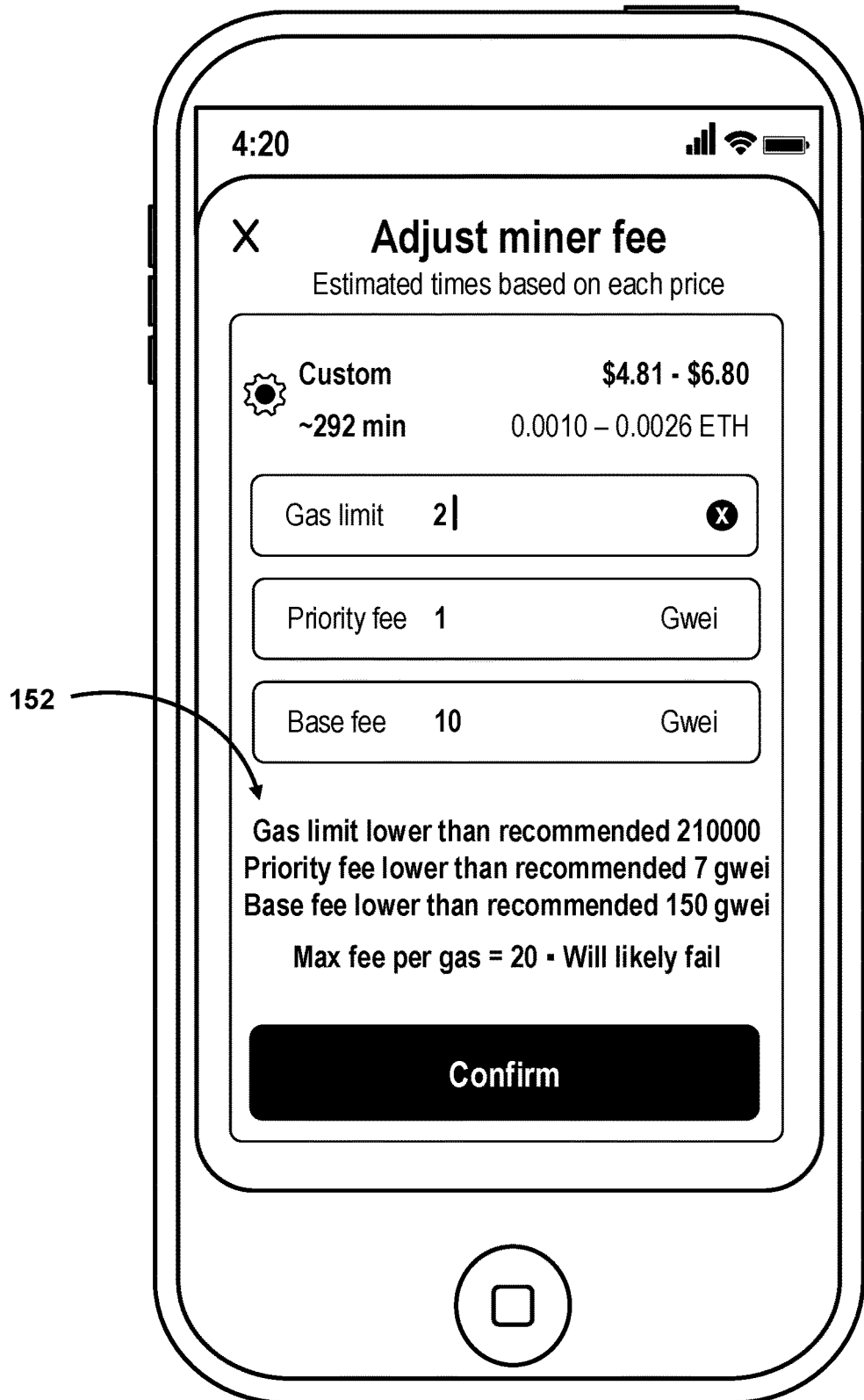

FIG. 1F illustrates user interface 150 in which the system generates recommendation 152 (e.g., a blockchain operation processing recommendation) indicating that the blockchain operation may not occur based on the current blockchain operation characteristics. For example, the system may also monitor the static blockchain operation characteristics as well as the dynamic blockchain operation characteristics. In some embodiments, the system may apply the two-tiered approach and determine that, based on the updated characteristics, the blockchain operation is likely to fail.

For example, the system may monitor network conditions for a blockchain network. The system may retrieve values (e.g., indicating network congestion, current gas limits per block etc.). The system may then compare the current blockchain operation characteristics to the retrieved values (or confidence thresholds based on the retrieved values). For example, the system may generate one or more thresholds (e.g., a threshold corresponding to a given likelihood that a blockchain operation will be completed with the current blockchain operation characteristics). In response to determining that the thresholds are not met, the system may generate a blockchain operation processing recommendation (e.g., a warning, error, etc.). In some embodiments, the blockchain operation processing recommendation may also include recommendations for blockchain operation characteristics or values thereof to meet a given threshold.

Figure 2:
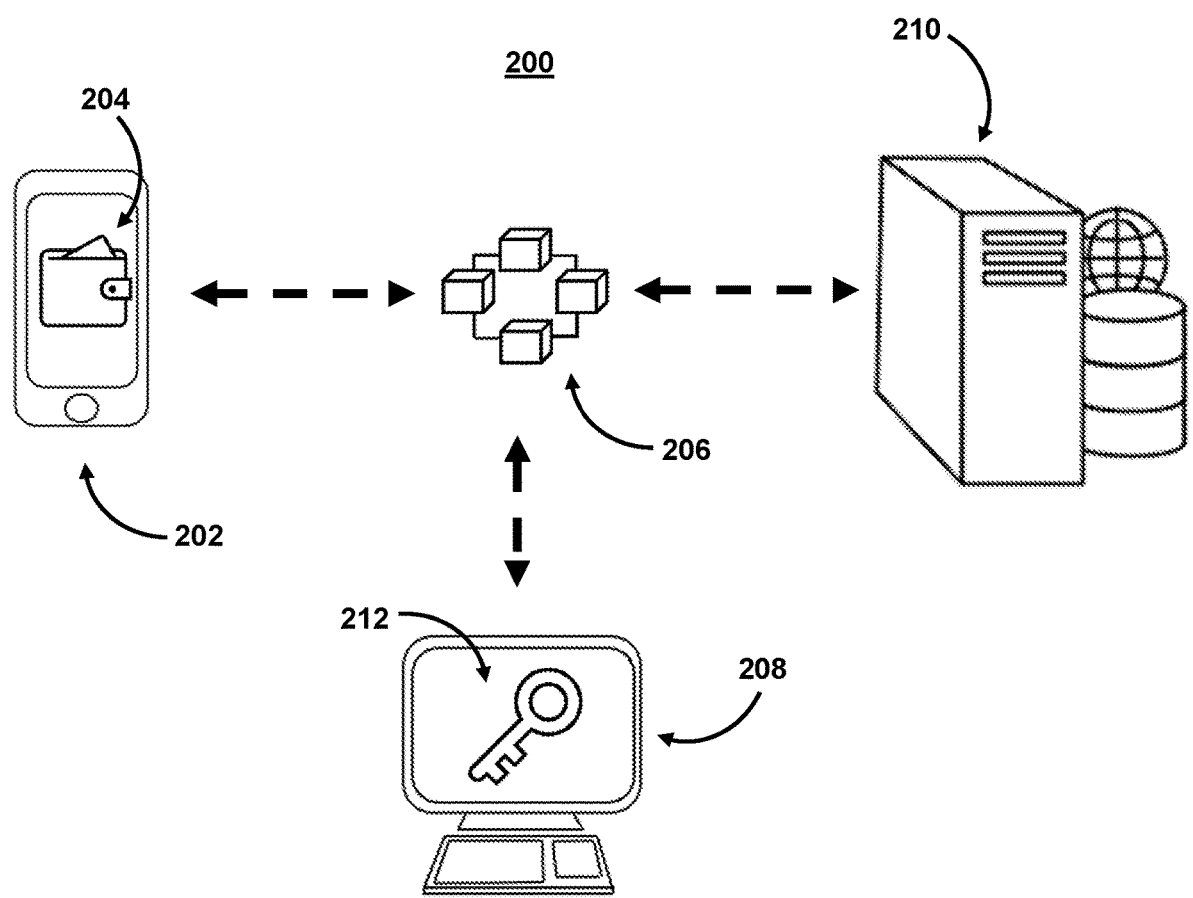
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to provide the features of FIGS. 1A-F in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to access the features of FIGS. 1A-F, and the user interface may display content related to the features of FIGS. 1A-F. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually. Each of the user devices may be used by the system to conduct blockchain operations and/or contribute to the features shown in FIGS. 1A-F.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as the features shown in FIGS. 1A-F. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
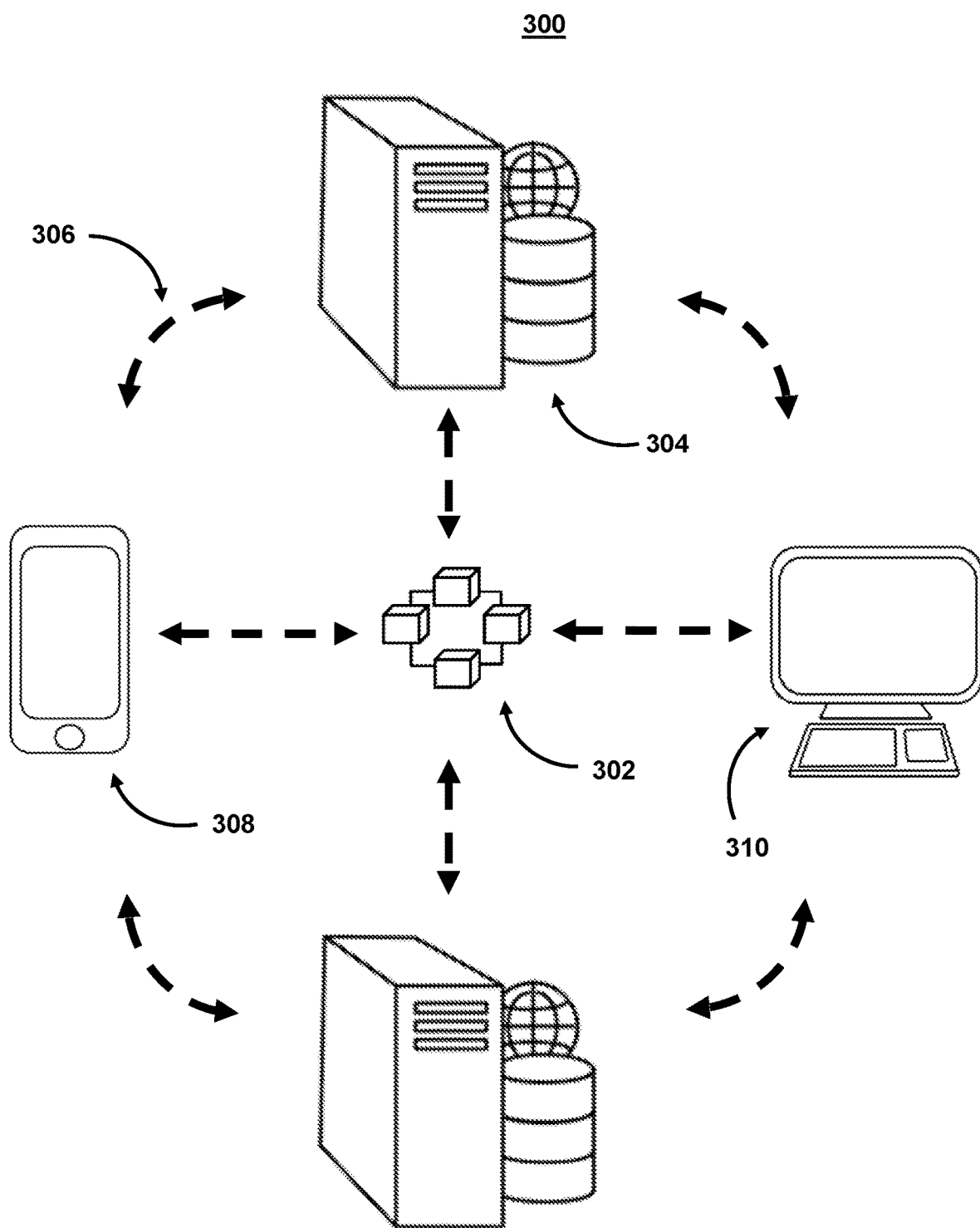
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may provide the features shown in FIGS. 1A-F within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (I/O) paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to the features shown in FIGS. 1A-F within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., electrically erasable programmable read-only memory (EEPROM), random access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., Internet protocol television), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
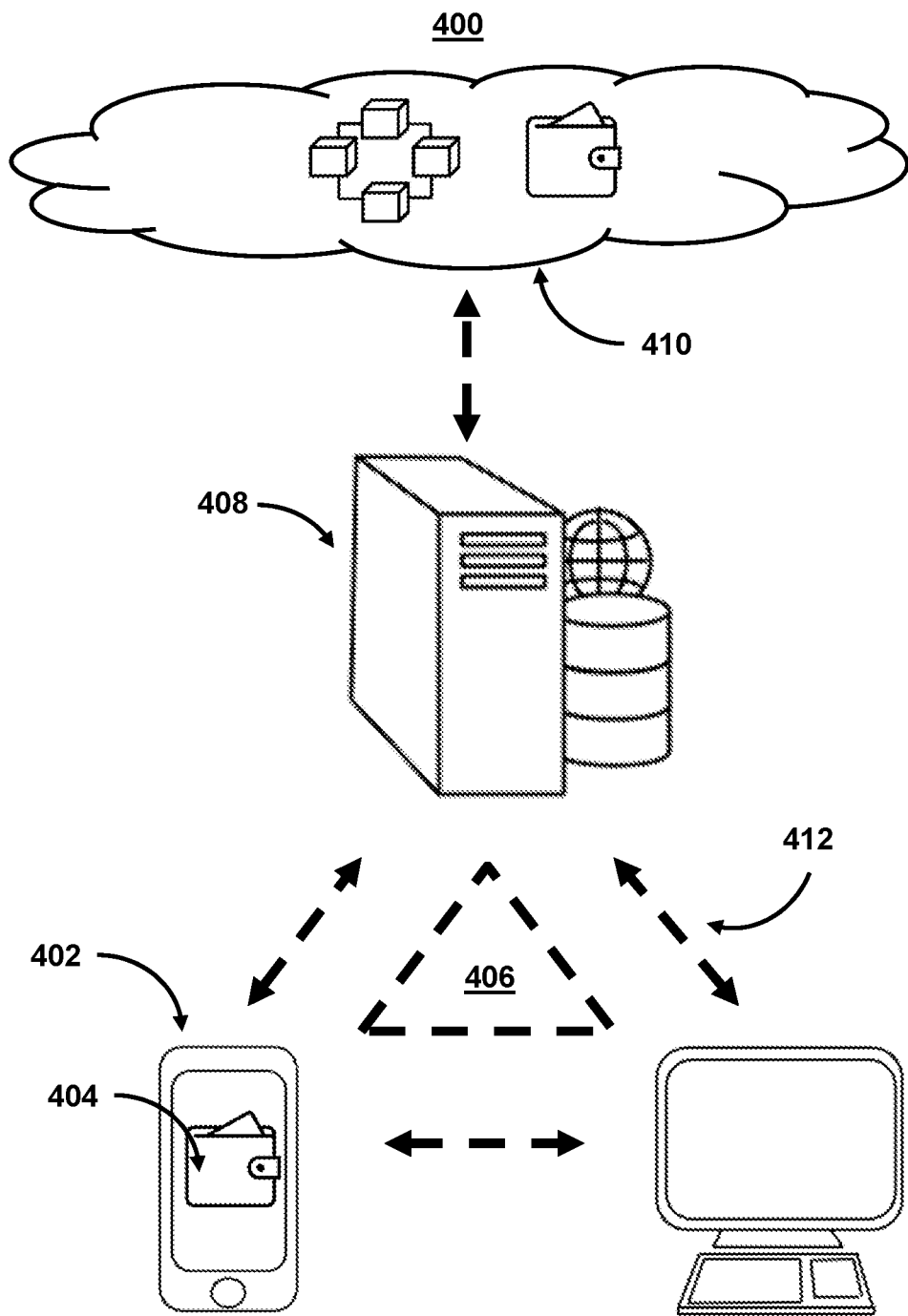
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to provide the features shown in FIGS. 1A-F. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate the features shown in FIGS. 1A-F. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as balance and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. Representational state transfer (REST) APIs do not typically have this contract; instead, they are documented with client libraries for most common languages including Ruby, Java, PHP, and JavaScript. Simple Object Access Protocol (SOAP) web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more application binary interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for bytecode to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely and, in an easily parsable format, does translations between human-intended method calls and smart-contract operations that are discoverable and reliable.

For example, ABI defines the methods and structures used to interact with the binary contract similar to an API, but on a lower level. The ABI indicates to the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
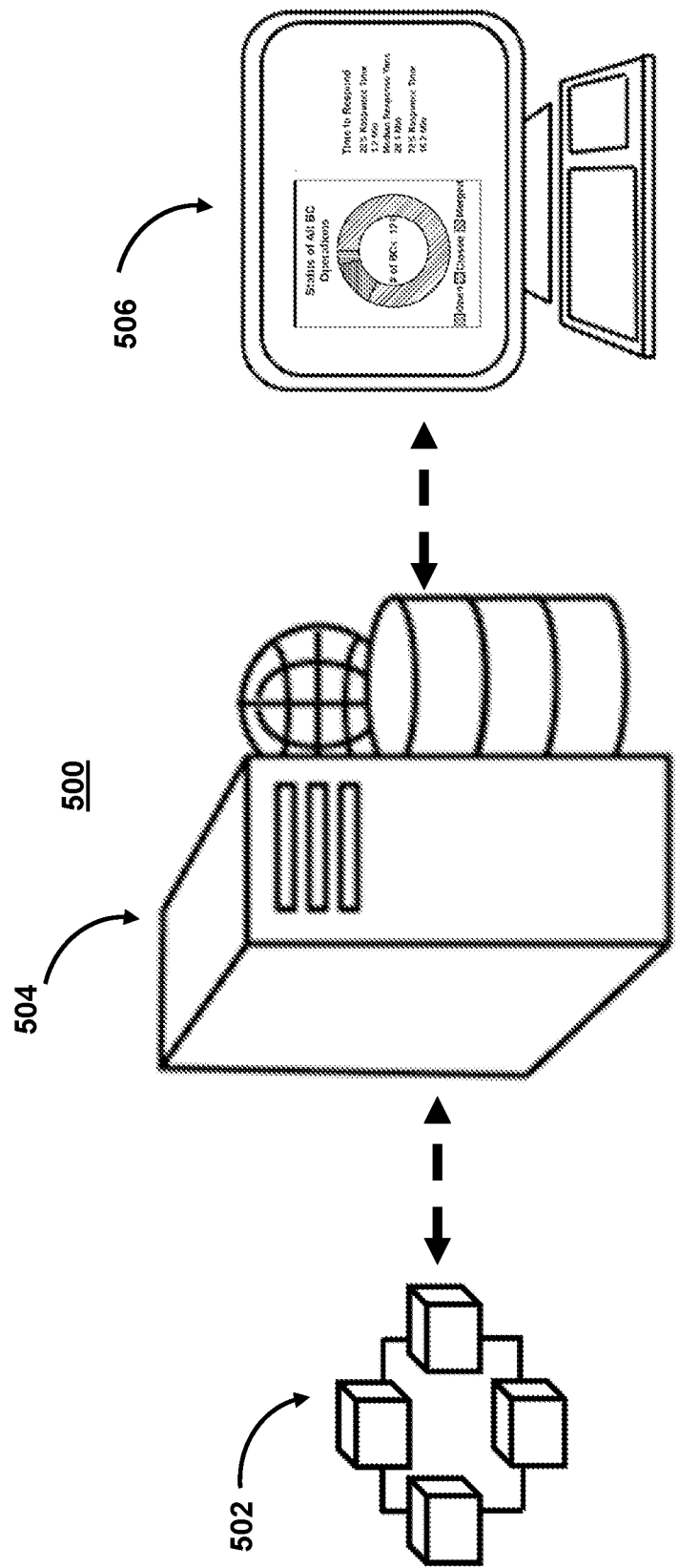
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to provider features described in FIGS. 1A-F. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," or "operation finalized") related to a given type of blockchain operation (e.g., "transaction," "external transfer," internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
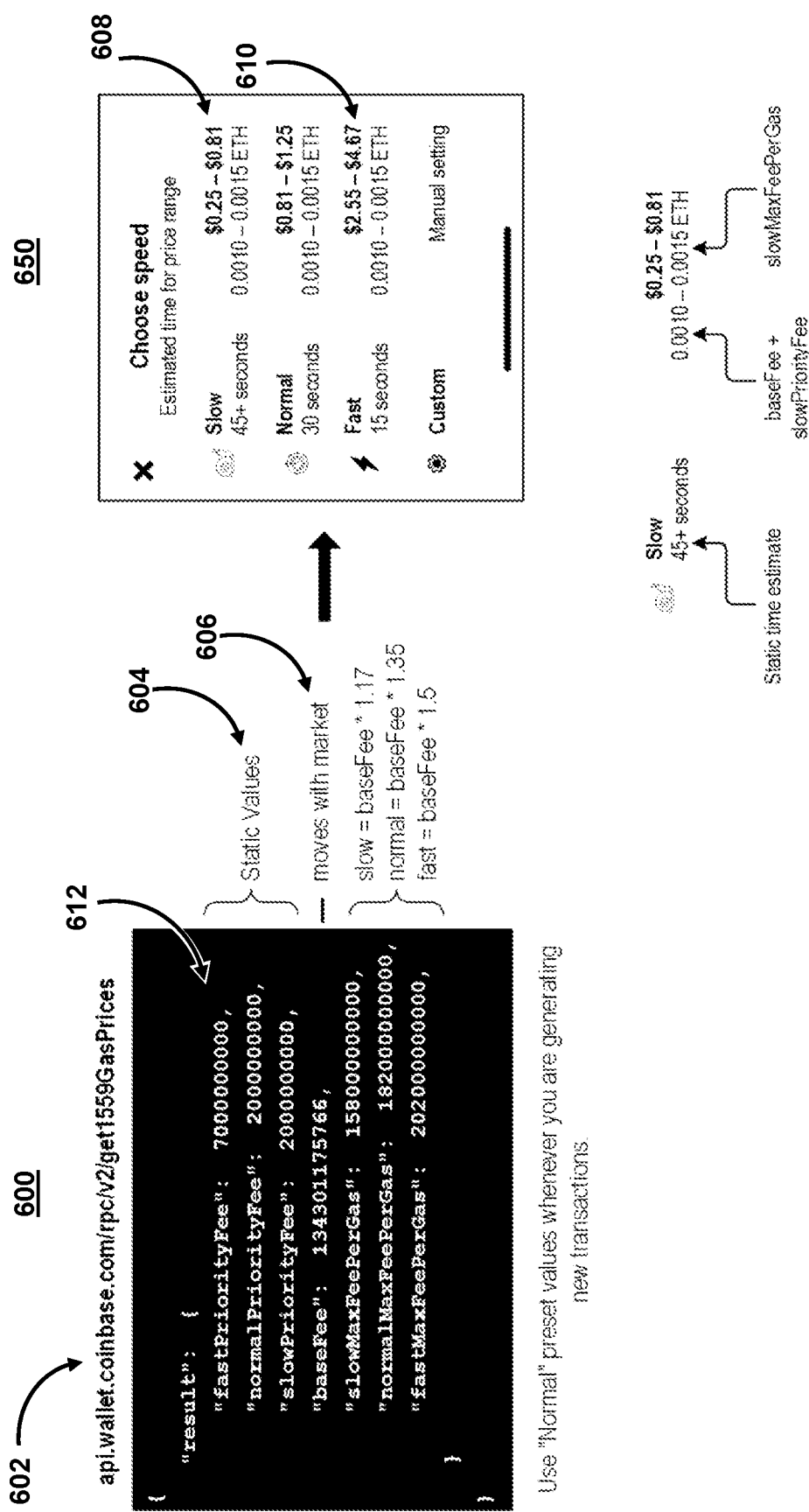
FIG. 6 shows an illustrative diagram for pseudocode and a corresponding user interface related to dynamic and static blockchain operation characteristics, in accordance with one or more embodiments.

FIG. 6 shows an illustrative diagram for pseudocode and a corresponding user interface related to dynamic and static blockchain operation characteristics, in accordance with one or more embodiments. For example, even after providing a dynamic gas fee range (as opposed to a static estimate), the system still needs to determine what blockchain operation characteristics to use to determine the dynamic gas range. Additionally or alternatively, the system also needs to determine how to integrate the ability to set different priorities (e.g., priority designations) for different blockchain operations within the dynamic gas fee range.

One solution for integrating the different priorities (e.g., priority designations) for different blockchain operations within the dynamic gas fee range would be to determine the various different blockchain operation characteristics for each priority and generate a dynamic gas fee with the highest upperbound and lowest lowerbound based on the various combinations of the different blockchain operation characteristics. However, such an approach leads to such a large range of values that the dynamic gas fee is unhelpful to users. Furthermore, the use of a combined dynamic gas fee is not helpful in distinguishing which blockchain operation characteristics correlate to range of the dynamic gas fee. Another approach would be to allow a user to enter various blockchain operation characteristics (and/or ranges for those blockchain operation characteristics). While this approach provides additional user control, this approach may reduce the seamlessness of the blockchain operations.

To overcome these novel technical problems related to the development of dynamic gas fees, the methods and systems described herein rely on an API for a decentralized application to select types of blockchain operation characteristics to set as static blockchain operation characteristics during a given blockchain operation (e.g., priority designations) and generate respective dynamic gas ranges based on a common dynamic blockchain operation characteristic. Notably, while the type of static blockchain operation characteristics selected may be static in that the user may not modify a value assigned by the API and that it is not directly related to a current state of the blockchain chain, the API may nonetheless determine a plurality of values for the static blockchain operation characteristic. The API may then match each of the values of the plurality of values to a common dynamic blockchain operation characteristic (e.g., a base fee) to generate a plurality of blockchain operation processing recommendations (e.g., recommendations indicating a dynamic gas range corresponding to a plurality of priority designations).

In some embodiments, methods and systems are described for facilitating blockchain operation characteristic selection when conducting blockchain operations using cryptography-based, storage applications. For example, the system may receive a first user request to perform a blockchain operation, of a plurality of blockchain operations, corresponding to a first cryptography-based, storage application. The system may receive the user request via a decentralized application browser implemented on a first user device configured to receive user requests for performing a plurality of blockchain operations corresponding to a blockchain network across a computer network and/or access a second partial private key that is stored on the user device (e.g., in blockchain operations that comprise MPC (multi-party computation in their digital signing process).

The system (e.g., an API) may determine, based on a first function (e.g., function 602), a first type of blockchain operation characteristics of a plurality of blockchain operation characteristics for generating a plurality of respective values for static blockchain operation characteristics for a plurality of blockchain operation processing recommendations, wherein each of the plurality of blockchain operation processing recommendations corresponds to a respective dynamic gas range of a plurality of dynamic gas ranges. For example, the system may determine values 604.

The system may generate the plurality of respective values for the first type of blockchain operation characteristics. The system may determine a dynamic blockchain operation characteristic (e.g., dynamic blockchain operation characteristic 606) based on a current state of a blockchain network. The system may generate a first dynamic gas range of the plurality of dynamic gas ranges (e.g., dynamic gas range 608) by combining the dynamic blockchain operation characteristic with a first value of the plurality of respective values (e.g., value 612) for the first type of blockchain operation characteristics. The system may generate a second dynamic gas range of the plurality of dynamic gas ranges (e.g., dynamic gas range 610) by combining the dynamic blockchain operation characteristic with a second value of the plurality of respective values for the first type of blockchain operation characteristics. The system may generate for display, on a user interface (e.g., user interface 650), a first blockchain operation processing recommendation, of the plurality of blockchain operation processing recommendations, based on the first dynamic gas range. The system may generate for display, on the user interface, a second blockchain operation processing recommendation, of the plurality of blockchain operation processing recommendations, based on the second dynamic gas range. The system may receive a user input corresponding to the first blockchain operation processing recommendation. The system may, in response to the user input, process the blockchain operation based on the first value.

For example, FIG. 6 includes pseudocode 600. Pseudocode 600 may be executed by a user device in order to provide the features of FIGS. 1A-F. As shown in pseudocode 600, the system may retrieve both static and dynamic blockchain operation characteristics. For example, the static blockchain operation characteristics may be set by the API used to facilitate blockchain operations in the user device. In contrast, the dynamic blockchain operation characteristics may be set by the current state of the blockchain network. That is, the dynamic blockchain operation characteristics (or values thereof) may move with a mainnet of the blockchain network.

In some embodiments, the system may also have rules in the API used to modify selected static blockchain characteristics. The system may also select an algorithm for responding to a request for a range of gas fees from a plurality of potential algorithms for determining the blockchain characteristics to use and/or the algorithm to use for determining a range of gas fees (e.g., when providing new gas values and/or a dynamic gas range for the client to use). The system may obtain a base fee by calling 'RPCGetBlock' on a node provider or calling a function (e.g., "Etherscan-Client.GetGasPrice( )") to determine one or more blockchain operation characteristics. In some embodiments, the system (e.g., an API) may use one or more functions to determine what type of blockchain operation characteristics to generate values for and/or what function to use to generate the values (or select the type). For example, the system may retrieve a user setting for a user account corresponding to the first cryptography-based, storage application. Based on the user setting, the system may select the first type of blockchain operation characteristics from the plurality of blockchain operation characteristics for generating the plurality of respective values for static blockchain operation characteristics. Alternatively or additionally, the system may retrieve a user setting for a user account corresponding to the first cryptography-based, storage application. Based on the user setting, the system may select the first function, of a plurality of functions, to determine a type of blockchain operation characteristics of the plurality of blockchain operation characteristics for generating the plurality of respective values for static blockchain operation characteristics.

Additionally or alternatively, the system may use preset values (e.g., in the API) to determine respective values (e.g., value 612) for assigning to one or more priority designations. In some embodiments, the system may retrieve historic blockchain operations and determine a value (or average value) corresponding to the completed blockchain operations. These values may be specific to blockchain operations that had a specific priority designation or may be based on all blockchain operations.

For example, the system may determine (e.g., with a given confidence) a value (e.g., a priority fee) corresponding to an average blockchain operation (e.g., over the past several blocks or time period) that was completed. The system may also monitor the trajectory of this value (e.g., whether it is increasing or decreasing) to determine what value to recommend (e.g., for a blockchain operation processing recommendation). For example, the system may determine several values (e.g., corresponding to various priority designations). The system may then use these values to generate the plurality of blockchain operation processing recommendations that correspond to various priorities.

The system may then use this value for the respective value and/or base the respective value off of these values. For example, the system may retrieve records for completed blockchain operations of a given time period. The system may determine values corresponding to the first type of blockchain operation characteristics for the records. The system may then determine the plurality of respective values for static blockchain operation characteristics for the plurality of blockchain operation processing recommendations based on the values corresponding to the first type of blockchain operation characteristics for the records.

Figure 7:
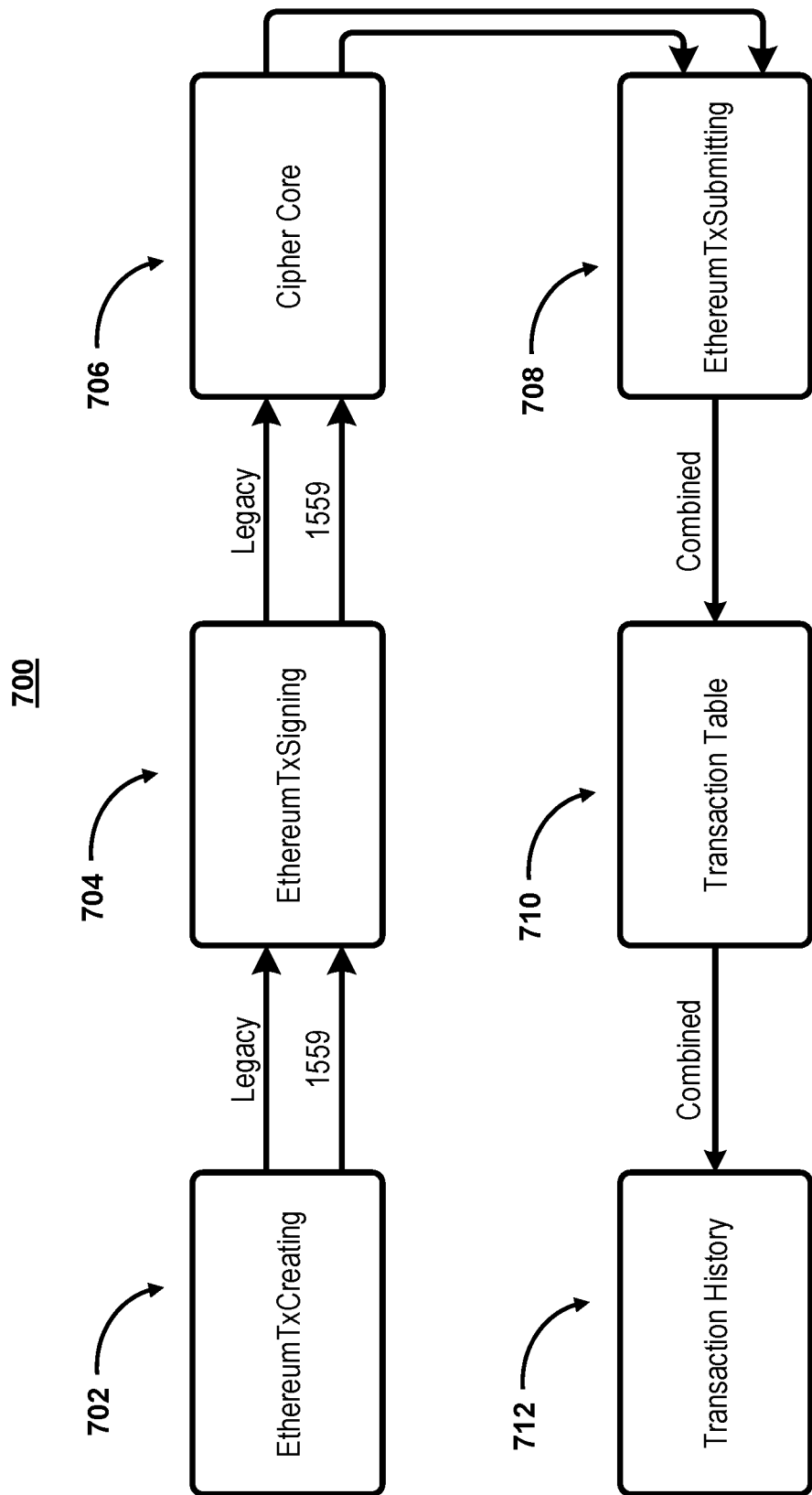
FIG. 7 shows a diagram for an architecture that maintains backward capability, in accordance with one or more embodiments.

FIG. 7 shows a diagram for an architecture that maintains backward capability, in accordance with one or more embodiments. A previously discussed, EIP-1559 will introduce a new blockchain operation type (e.g., a transaction based on a new EIP-2718 transaction envelope type). The EIP-2718 transaction envelope type allows for the use of transaction pricing mechanism that includes fixed-per-block portion of the network fee (e.g., the base fee) that is burned and dynamically expands/contracts block sizes to deal with transient congestion as opposed to the first-price action.

Given the multiple operation types, client devices are required to process blockchain operations that use both legacy gas fee calculation and the new gas fee calculation using the same wallet application. An initial technical hurdle to overcome with respect to enabling a new operation type (e.g., a gas fee calculated based on the transaction pricing) for use with blockchain operations is to ensure that clients that use the new operation type are backward compatible with any legacy operation types (e.g., a gas fee calculated based on a prior transaction pricing such as the first-price auction). For example, the new operation type involves the use of a new format for transaction requests that includes new categories of data that are processed by the protocol itself. Thus, any client device needs to discern the operation type of a blockchain operation as well as ensure that the blockchain operation may still be processed by the protocol. One such existing client device may include a wallet application for conducting blockchain operations.

One solution to ensuring that existing systems are backward compatible for the operation type is to reformat all transaction requests for blockchain operations into legacy operation type prior to processing. Alternatively, the system may reformat all requests (e.g., irrespective of what operation type is used) into a standardized operations type in order to allow the existing client systems to process the request. However such solutions add an additional burden to the client device and require the client device to maintain strict adherence to the formatting (and reformatting) requirements of multiple operation types to ensure that the protocol may process reformatted requests. By doing so, the client device is at risk of overloading its core logical component's handling of the blockchain operation data (e.g., transaction data) and thus increasing the likelihood of a failure.

In contrast to these potential solutions, the methods and systems describe a novel architecture for clients, and in particular wallet applications, to handle new operation types as well as ensure backward compatibility. In particular, the architecture creates parallel logic pathways for legacy and for new operation types (e.g., EIP-1599 transactions). However, creating parallel logic pathways create a novel problem in that the multiple blockchain operations may be submitted to a blockchain network. While such an approach would not be detrimental if the underlying blockchain operations (e.g., transactions performed using either operation type) were kept separate and monitored on different blockchain networks, blockchain operations on a blockchain network are not structured this way. Furthermore, maintaining separate blockchain networks would prevent the backward compatibility needed.

To overcome this novel technical problem, the novel architecture maintains a separate logic pathway corresponding to a first operation type and a second operation type, until either a blockchain operation is submitted to the blockchain network using either the first operation type or a second operation type. Following submission of the blockchain operation to the blockchain network, the novel architecture collapses the parallel logic pathways to a single logical pathway for both types. For example, in order to avoid overloading the core logical component's handling of blockchain operation data, the system uses parallel logic pathways and types for legacy and for EIP-1559 blockchain operations (e.g., for different operation types). After the blockchain operation is submitted to the network, the system may then collapse into a single logical pathway.

At step 702, process 700 creates a blockchain operation. For example, the system may receive, at a first user device, a first user request to execute a first blockchain operation using a first cryptography-based, storage application. The system may, in response to receiving the first user request, determine that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. For example, a second blockchain operation type may not comprise a first envelope standard (e.g., a Typed Transaction Envelope corresponding to EIP-2178). The second blockchain operation type may comprise a different envelope standard and/or may not comprise any envelope standard. The system may, in response to determining that the first blockchain operation corresponds to the first blockchain operation type, process the first blockchain operation using a first logic pathway of a plurality of logic pathways for the first cryptography-based, storage application, wherein the plurality of logic pathways comprise respective logic pathways for processing blockchain operations having different blockchain operation types. For example, as shown in FIG. 7, process 700 includes parallel logic pathways for the two operation types.

At step 704, process 700 performs a blockchain operation signing process. In some embodiments, the signing process may include multi-party computation (e.g., MPC). MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$). Together, the parties may use their respective private data to compute a value of a public function: (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key).

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to 12 signature rounds, which can create latency issues. Second, they require the use of online storage for private keys. Due to the use of partial private keys (e.g., comprising an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security).

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time.

The system may, in response to processing the first blockchain operation using the first logic pathway, submit the first blockchain operation to a blockchain network corresponding to the first blockchain operation. The system may, in response to submitting the first blockchain operation to the blockchain network, process the first blockchain operation using a combined logic pathway, wherein the combined logic pathway comprises a single logic pathway for processing blockchain operations having different blockchain operation types.

At step 706, process continues the use of parallel logic pathways at the cipher core. For example, after generating the signed blockchain operation the system proceeds to a confirmation screen (e.g., as shown in FIG. 1B). The system may then use the new/rpc/v1/swap/estimateGasUsed endpoint for determining gas limit in order to properly display fees. The actual gasLimit submitted in the blockchain operation may be set arbitrarily high to ensure the blockchain operation succeeds. Legacy blockchain operations may continue to estimate fees on the back end via the/rpc/v1/swap/estimateMinerFee endpoint.

At step 706, the system interprets data according to its operation type. For example, legacy blockchain operations (e.g., blockchain operations corresponding to a legacy operation type) contain a nonce, gas price, gas limit, to address, value, data, v, r, and s. These fields are RLP-encoded as: RLP([nonce, gasPrice, gasLimit, to, value, data, v, r, s]). In contrast, a different operation type (e.g., corresponding to EIP-1559) is interpreted as TransactionType-||TransactionPayload where the TransactionPayload is similarly encoded: RLP([chainId, nonce, maxPriorityFeePerGas, maxFeePerGas, gasLimit, to, value, data, accessList, v, r, s]). Additionally, the TransactionType is Integer 2, and the call to generate a hash for the signed transaction are the processes as: keccak256(Buffer.concat([bufferFromNumber(2), rlp.encode(chainId, nonce, maxPriorityFeePerGas, maxFeePerGas, gasLimit, to, value, data, accessList, signatureYParity, signatureR, signatureS)])). The cipher core will return the hash and the signedTx as '${hash} ${SignedTransaction}' and the client will split the result.

At step 708, process 700 submits the blockchain operation, after which a combined logic pathway is used. For example, process 700 may record the transaction at step 710 (e.g., in an indexing application as described in FIG. 5) and may generate a single transaction history as step 712. The system may then display the blockchain operation in completed blockchain operations history (e.g., as shown in FIG. 1A).

Figure 8:
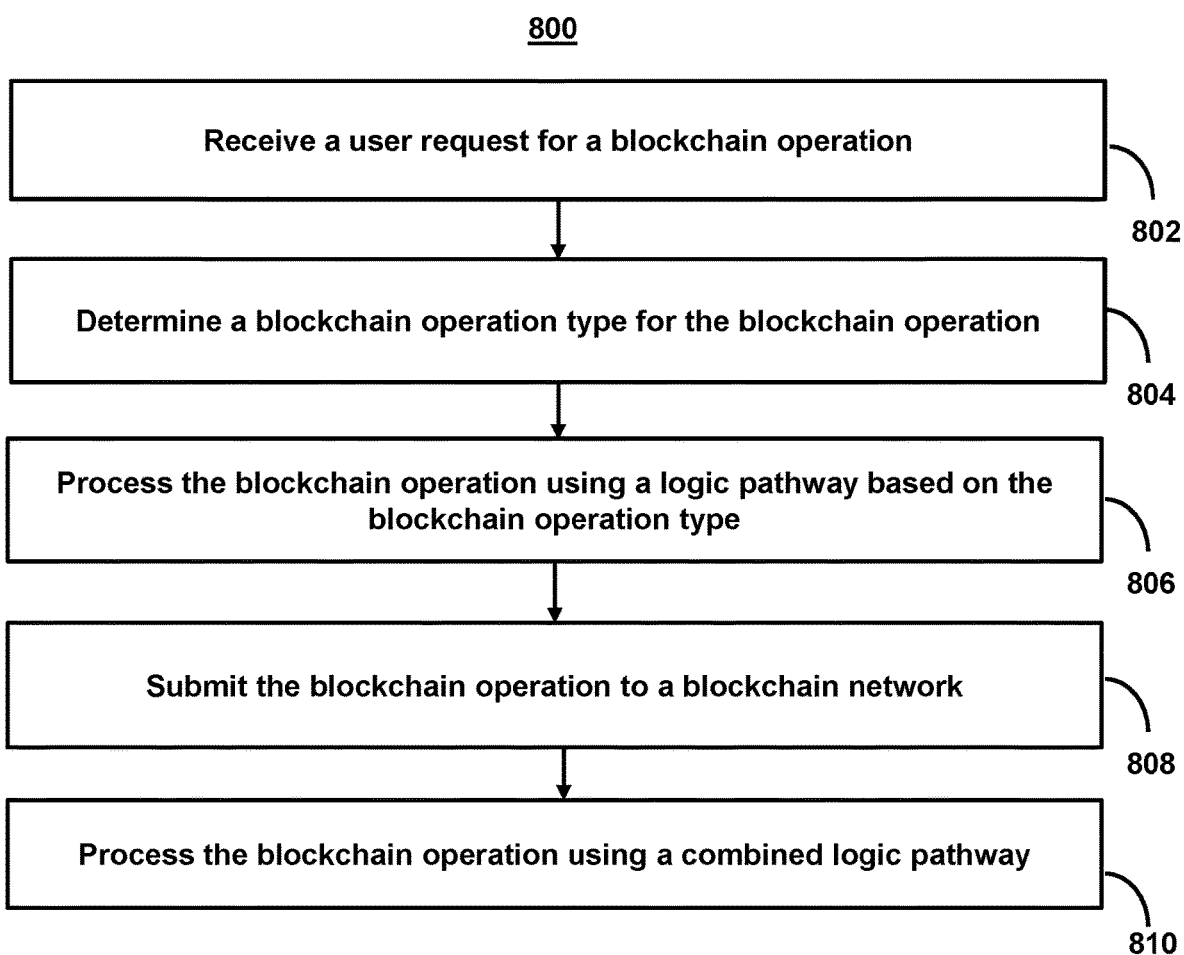
FIG. 8 shows a flowchart of the steps involved in processing blockchain operations featuring a plurality of blockchain operation types in accordance with one or more embodiments.

FIG. 8 shows a flowchart of the steps involved in processing blockchain operations featuring a plurality of blockchain operation types in accordance with one or more embodiments. For example, the system may use process 800 (e.g., as implemented on one or more system components described above) in order to provide the features described in FIGS. 1A-F. The system may use one or more components to perform process 800. For example, the system may comprise a first cryptography-based, storage application, wherein the first cryptography-based, storage application corresponds to a first private key, and wherein the first private key is stored on a user device. The system may also comprise a second cryptography-based, storage application, wherein the second cryptography-based, storage application corresponds to a first partial private key and a second partial private key, wherein the first partial private key is stored on a remote device network, and wherein the second partial private key is stored on the user device. The system may comprise and/or query a blockchain node, wherein the blockchain node verifies batches of blockchain operations, and wherein each batch of the batches comprises a plurality of blockchain operations involving the first cryptography-based, storage application and the second cryptography-based, storage application. Additionally or alternatively, the system may also use a cryptography-based, indexing application, wherein the cryptography-based, indexing application comprises a queryable record of a subset of blockchain operations occurring on the blockchain network.

At step 802, process 800 (e.g., using one or more components described above) receives a user request for a blockchain operation. For example, the system may receive, at a first user device, a first user request to execute a first blockchain operation using a first cryptography-based, storage application. The first cryptography-based, storage application may be used to perform a plurality of blockchain operations across a computer network based on a combined use of a first public key, a first partial private key, and a second partial private key, and wherein the second partial private key is not accessible to a platform service facilitating the first cryptography-based, storage application.

In some embodiments, the system may process blockchain operations with different blockchain operation types. For example, the first blockchain operation type may comprise a first format with a single value for a first blockchain operating requirement, and the second blockchain operation type comprises a second format with two values for the first blockchain operating requirement, wherein the two values comprise a first value corresponding to an upperbound of a total gas allotment and a second value corresponding to an upperbound of a gas allotment distributed to a validator of the first blockchain operation.

At step 804, process 800 (e.g., using one or more components described above) receives a user request for a blockchain operation. For example, the system may, in response to receiving the first user request, determine that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. For example, the system may receive a user request that comprises replacing a pending blockchain operation with the first blockchain operation.

At step 806, process 800 (e.g., using one or more components described above) processes the blockchain operation using a logic pathway based on the blockchain operation type. For example, the system may, in response to determining that the first blockchain operation corresponds to the first blockchain operation type, process the first blockchain operation using a first logic pathway of a plurality of logic pathways for the first cryptography-based, storage application, wherein the plurality of logic pathways comprise respective logic pathways for processing blockchain operations having different blockchain operation types.

For example, the logic pathway may comprise a hierarchal set of interrelated functions performed by an application programming interface. Each logic pathway may be designed to perform functions and/or may be specialized for different blockchain operation characteristics. For example, the first logic pathway may comprise a first logical component for creating the first blockchain operation based on the first user request, the first blockchain operation type, and a first standard for the blockchain network. Additionally or alternatively, the first logic pathway comprises a second logical component for digitally signing the first blockchain operation based on the first user request, the first blockchain operation type, and a first standard for the blockchain network.

At step 808, process 800 (e.g., using one or more components described above) submits the blockchain operation to a blockchain network. For example, the system may, in response to processing the first blockchain operation using the first logic pathway, submit the first blockchain operation to a blockchain network corresponding to the first blockchain operation. In some embodiments, the system may process and/or submit multiple types of blockchain operations as well as generate information about the blockchain operations. For example, the system may determine a first dynamic gas range for the blockchain operation, wherein a lowerbound of the first dynamic gas range is based on a static blockchain operation characteristic and a dynamic blockchain operation characteristic.

At step 810, process 800 (e.g., using one or more components described above) processes the blockchain operation using a combined logic pathway. For example, the system may, in response to submitting the first blockchain operation to the blockchain network, process the first blockchain operation using a combined logic pathway, wherein the combined logic pathway comprises a single logic pathway for processing blockchain operations having different blockchain operation types. For example, the combined logic pathway may comprise a hierarchal set of interrelated functions performed by an application programming interface and may be designed to perform functions and/or may be specialized for many different types of blockchain operation characteristics. The combined logic pathway may perform functions to complete blockchain operations and/or update system components based on submitted blockchain operations. For example, the combined logic pathway comprises a third logical component for recording the first blockchain operation in a blockchain indexing application that comprises a queryable record of a subset of blockchain operations occurring on the blockchain network.

Additionally or alternatively, the system may receive additional user requests. For example the system may receive, at the first user device, a second user request to execute a second blockchain operation using the first cryptography-based, storage application. In response to receiving the second user request, the system may determine that the second blockchain operation corresponds to a second blockchain operation type of the plurality of blockchain operation types. In response to determining that the second blockchain operation corresponds to the second blockchain operation type, the system may process the second blockchain operation using a second logic pathway of the plurality of logic pathways for the first cryptography-based, storage application. In response to processing the second blockchain operation using the second logic pathway, the system may submit the second blockchain operation to the blockchain network. In response to submitting the second blockchain operation to the blockchain network, the system may process the second blockchain operation using the combined logic pathway.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

Figure 9:
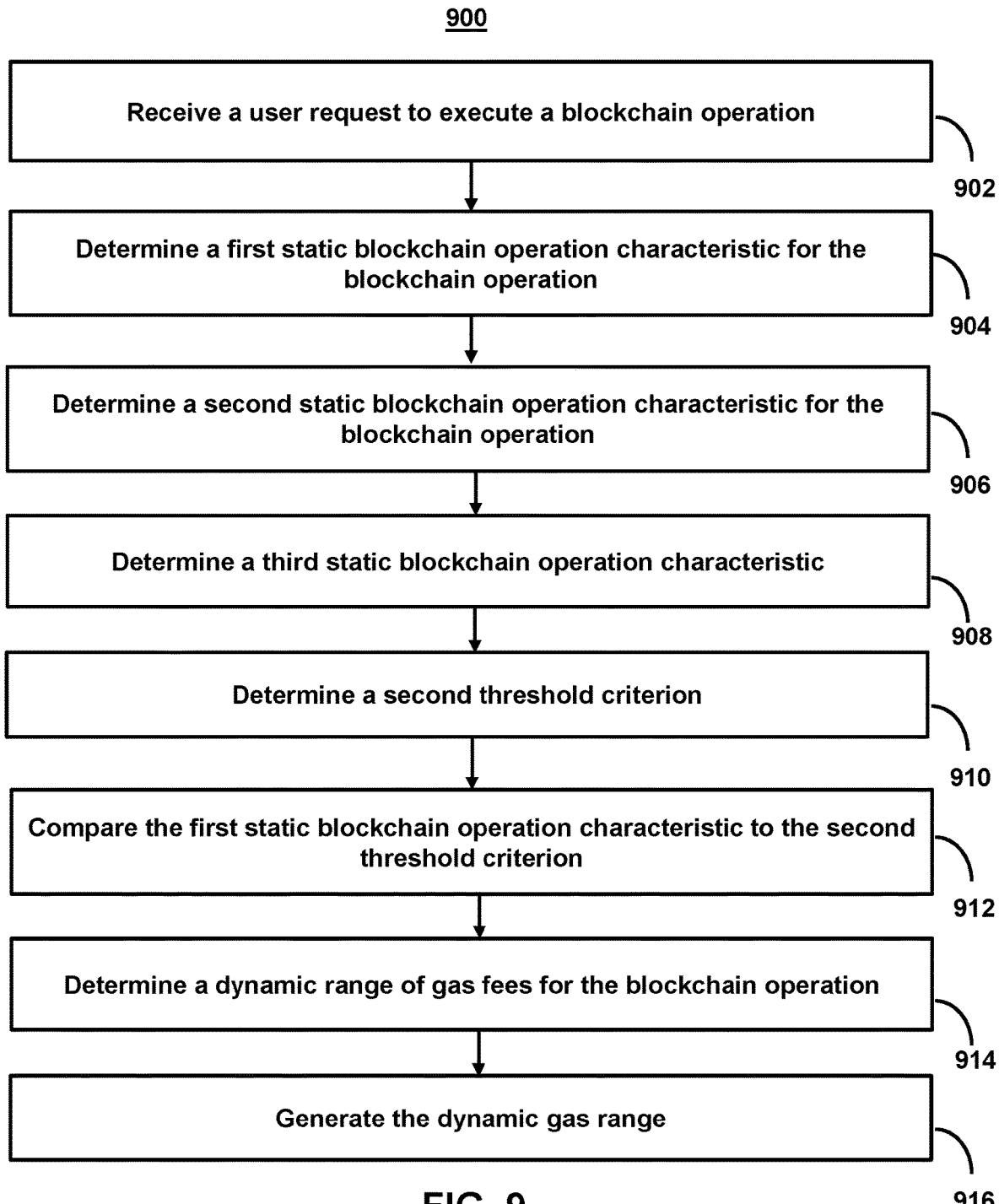
FIG. 9 shows a flowchart of the steps involved in determining dynamic gas range for blockchain operations using a two-tier approach, in accordance with one or more embodiments.

FIG. 9 shows a flowchart of the steps involved in determining dynamic gas range for blockchain operations using a two-tier approach, in accordance with one or more embodiments.

For example, the system may use process 900 (e.g., as implemented on one or more system components described above) in order to provide the features described in FIGS. 1A-F. The system may use one or more components to perform process 800. For example, the system may comprise a first cryptography-based, storage application, wherein the first cryptography-based, storage application corresponds to a first private key, and wherein the first private key is stored on a user device. The system may also comprise a second cryptography-based, storage application, wherein the second cryptography-based, storage application corresponds to a first partial private key and a second partial private key, wherein the first partial private key is stored on a remote device network, and wherein the second partial private key is stored on the user device. The system may comprise and/or query a blockchain node, wherein the blockchain node verifies batches of blockchain operations, and wherein each batch of the batches comprises a plurality of blockchain operations involving the first cryptography-based, storage application and the second cryptography-based, storage application. Additionally or alternatively, the system may also use a cryptography-based, indexing application, wherein the cryptography-based, indexing application comprises a queryable record of a subset of blockchain operations occurring on the blockchain network.

At step 902, process 900 (e.g., using one or more components described above) receives a user request to execute a blockchain operation. For example, the system may receive, at a first user device, a first user request to execute a blockchain operation using a first cryptography-based, storage application. The first cryptography-based, storage application may be used to perform a plurality of blockchain operations across a computer network based on a combined use of a first public key, a first partial private key, and a second partial private key, and wherein the second partial private key is not accessible to a platform service facilitating the first cryptography-based, storage application. In some embodiments, the system may process the blockchain operation based on an operation type of the blockchain operation. For example, the system may determine that the blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. The system may then, in response to determining that the blockchain operation corresponds to the first blockchain operation type, determine a static gas fee for the blockchain operation based on the first static blockchain operation characteristic.

At step 904, process 900 (e.g., using one or more components described above) determines a first static blockchain operation characteristic for the blockchain operation. For example, the system may, in response to receiving the first user request, determine a first static blockchain operation characteristic for the blockchain operation, wherein the first static blockchain operation characteristic is based on a first user input.

At step 906, process 900 (e.g., using one or more components described above) determines a second static blockchain operation characteristic for the blockchain operation. For example, the system may, in response to determining that the first static blockchain operation characteristic equals or exceeds a first threshold criterion, determine a second static blockchain operation characteristic for the blockchain operation, wherein the second static blockchain operation characteristic is based on a second user input.

For example, the second static blockchain operation characteristic may comprise a priority designation. In such cases, the system may determine if the max fee is less than or equal to the base fee and the max priority fee (e.g., based on the priority designation). For example, the system may confirm the blockchain operation as long as the base fee remains lower than the max fee and any remaining gas will be consumed as a priority fee. The system may then be confirmed at a specific fee, and the system may not display a gas range.

In some embodiments, the system may compare the first static blockchain operation characteristic to a first threshold criterion. For example, the system may compare the first static blockchain operation characteristic to a first threshold criterion to determine whether the first static blockchain operation characteristic equals or exceeds the first threshold criterion. For example, the first threshold criterion may comprise the base fee.

For example, the first static blockchain operation characteristic for the blockchain operation may comprise determining a max fee. In such cases, the system may determine if the max fee is less than or equal to a base fee. For example, the system may not confirm the blockchain operation until the base fee drops to match the max fee. When these two values are determined to match, the system may confirm the blockchain operation at approximately the max value.

At step 908, process 900 (e.g., using one or more components described above) determines a third static blockchain operation characteristic. For example, the system may determine a third static blockchain operation characteristic for the blockchain operation based on the second static blockchain operation characteristic. For example, the third static blockchain operation characteristic may comprise a max priority fee.

At step 910, process 900 (e.g., using one or more components described above) determines a second threshold criterion. For example, the system may determine a second threshold criterion based on a sum of the third static blockchain operation characteristic and the first threshold criterion.

At step 912, process 900 (e.g., using one or more components described above) compares the first static blockchain operation characteristic to the second threshold criterion. For example, the system may compare the first static blockchain operation characteristic to the second threshold criterion to determine whether the first static blockchain operation characteristic exceeds the second threshold criterion.

In contrast, in response to determining that the first static blockchain operation characteristic does not exceed the second threshold criterion, the system may determine a static gas fee for the blockchain operation, wherein the static gas fee is based on the first static blockchain operation characteristic and the fourth dynamic blockchain operation characteristic.

At step 914, process 900 (e.g., using one or more components described above) determines a dynamic range of gas fees for the blockchain operation. For example, the system may, in response to determining that the first static blockchain operation characteristic exceeds the second threshold criterion, determine a first dynamic gas range for the blockchain operation, wherein a lowerbound of the first dynamic gas range is based on the second threshold criterion and a fourth dynamic blockchain operation characteristic, wherein the fourth dynamic blockchain operation characteristic is based on a current state of the blockchain network. Additionally or alternatively, the dynamic gas range may comprise an upperbound of the first dynamic gas range that is based on the first static blockchain operation characteristic and the fourth dynamic blockchain operation characteristic. For example, the fourth dynamic blockchain operation characteristic may comprise a gas limit.

At step 916, process 900 (e.g., using one or more components described above) generates the dynamic gas range. For example, the system may generate for display, in a user interface, the first dynamic gas range for the blockchain operation.

In some embodiments, the system may receive subsequent user requests. For example, the system may receive, at the first user device, a second user request confirming execution of the blockchain operation. The system may determine an actual gas fee for the blockchain operation. The system may then conduct the blockchain operation with the actual gas fee using the first cryptography-based, storage application.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

Figure 10:
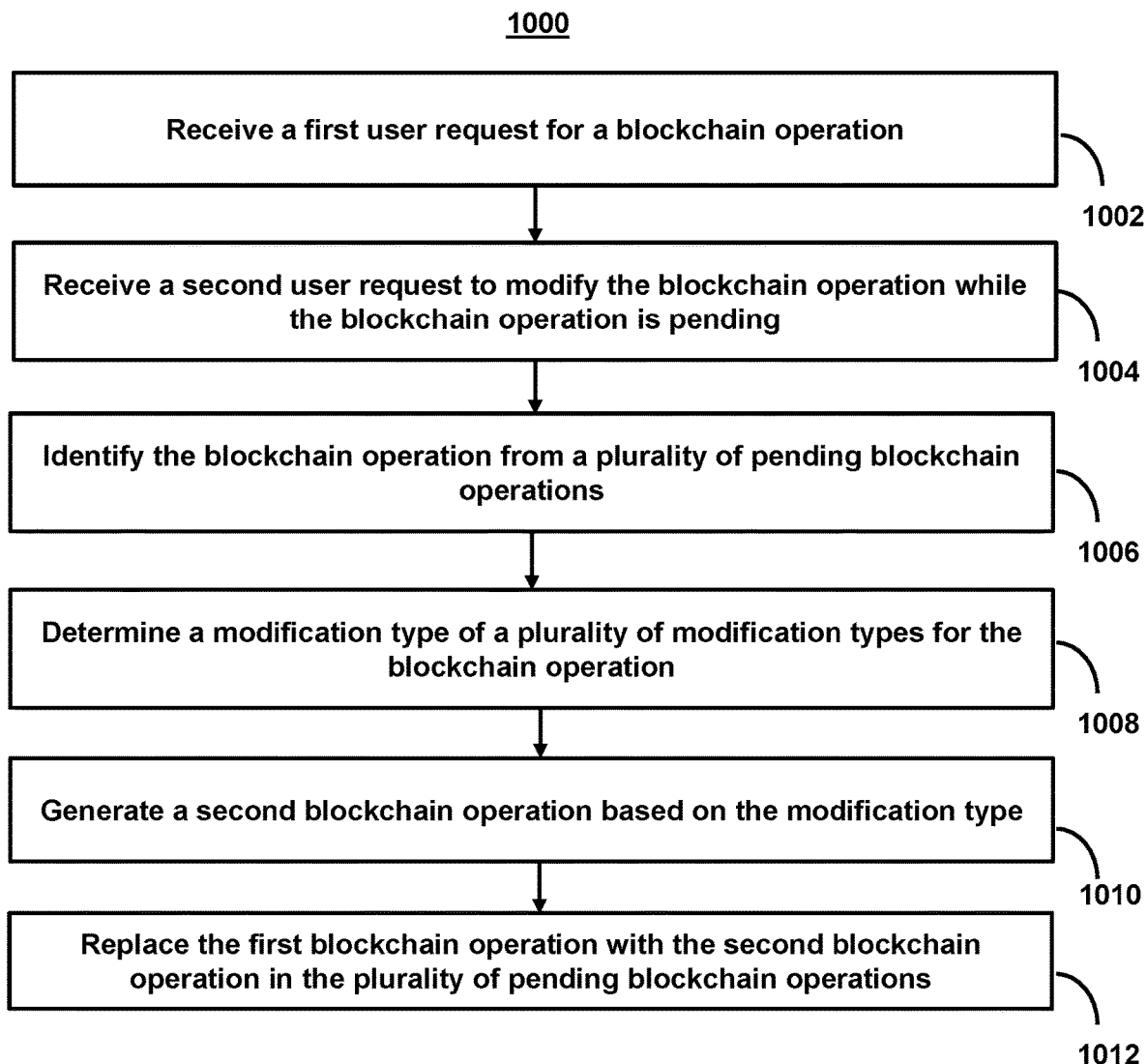
FIG. 10 shows a flowchart of the steps involved in modifying pending blockchain operations by mimicking the pending blockchain operation, in accordance with one or more embodiments.

FIG. 10 shows a flowchart of the steps involved modifying pending blockchain operations by mimicking the pending blockchain operation, in accordance with one or more embodiments. For example, the system may use process 1000 (e.g., as implemented on one or more system components described above) in order to provide the features described in FIGS. 1A-F. For example, the system may prove speed up and cancel blockchain operation features that are accessible on both the asset detail screen and global transaction history screen. The speed up feature may allow a user to replace a pending transaction with a new transaction of the same data but with higher gas fees. The cancel feature may allow a user to replace the pending transaction with a new transaction of the same data but with $0.00 amount and higher gas fees.

At step 1002, process 1000 (e.g., using one or more components described above) receives a first user request for a blockchain operation. For example, the system may receive, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic. For example, the first cryptography-based, storage application is used to perform a plurality of blockchain operations across a computer network based on a combined use of a first public key, a first partial private key, and a second partial private key, and wherein the second partial private key is not accessible to a platform service facilitating the first cryptography-based, storage application.

At step 1004, process 1000 (e.g., using one or more components described above) receives a second user request to modify the blockchain operation while the blockchain operation is pending. For example, the system may, while the first blockchain operation is pending, receive, via the user interface of the user device, a second user request to modify the first blockchain operation.

At step 1006, process 1000 (e.g., using one or more components described above) identifies the blockchain operation from a plurality of pending blockchain operations. For example, the system may, in response to the second user request, determine a first nonce value for the first blockchain operation. The system may then identify the first blockchain operation from a plurality of pending blockchain operations based on the first nonce value.

At step 1008, process 1000 (e.g., using one or more components described above) determines a modification type of a plurality of modification types for the blockchain operation. For example, the system may, in response to identifying the first blockchain operation, determine a first modification type of a plurality of modification types for the first blockchain operation.

At step 1010, process 1000 (e.g., using one or more components described above) generates a second blockchain operation based on the modification type. For example, the system may select the first type of static blockchain operation characteristic for modification based on the first modification type. The system may determine a third value for the first type of static blockchain operation characteristic. The system may then generate a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation.

At step 1012, process 1000 (e.g., using one or more components described above) replaces the first blockchain operation with the second blockchain operation in the plurality of pending blockchain operations. For example, the system may, in response to generating the second blockchain operation, automatically, without further user input, replace the first blockchain operation with the second blockchain operation in the plurality of pending blockchain operations.

For example, the system may generate changes to priority via this process for an unlimited amount of time. For example, while the second blockchain operation is pending, the system may receive, via the user interface of the user device, a third user request to modify the second blockchain operation. In response to the third user request, the system may determine a second nonce value for the second blockchain operation. The system may identify the second blockchain operation from the plurality of pending blockchain operations based on the second nonce value. In response to identifying the second blockchain operation, the system may determine the first modification type of the plurality of modification types for the second blockchain operation. The system may select the first type of static blockchain operation characteristic for modification based on the first modification type. the system may determine a fourth value for the first type of static blockchain operation characteristic. The system may generate a third blockchain operation using the first cryptography-based, storage application, wherein the third blockchain operation comprises the fourth value for the first type of static blockchain operation characteristic and the second value for the second type of static blockchain operation characteristic, and wherein a second set of additional values for additional types of static blockchain operation characteristics are automatically populated based on the second blockchain operation. In response to generating the third blockchain operation, automatically, without further user input, the system may replace the second blockchain operation with the third blockchain operation in the plurality of pending blockchain operations. For example, having the fourth value for the first type of static blockchain operation characteristic may cause the third blockchain operation to have a higher priority than the second blockchain operation.

In contrast, the system may also cancel a blockchain operation. For example, while the second blockchain operation is pending, the system may receive, via the user interface of the user device, a fourth user request to modify the second blockchain operation. The system may, in response to the fourth user request, determine a second nonce value for the second blockchain operation. The system may identify the second blockchain operation from the plurality of pending blockchain operations based on the second nonce value. The system may, in response to identifying the second blockchain operation, determine a second modification type of the plurality of modification types for the second blockchain operation. The system may select the second type of static blockchain operation characteristic for modification based on the second modification type. The system may determine a fourth value for the first type of static blockchain operation characteristic. The system may generate a second blockchain operation using the first cryptography-based, storage application, wherein the second blockchain operation comprises the third value for the first type of static blockchain operation characteristic and the fourth value for the second type of static blockchain operation characteristic, and wherein a second set of additional values for additional types of static blockchain operation characteristics are automatically populated based on the second blockchain operation. The system may, in response to generating the second blockchain operation, automatically, without further user input, replace the first blockchain operation with the second blockchain operation in the plurality of pending blockchain operations and canceling the second blockchain operation in the plurality of pending blockchain operations.

In some embodiments, in response to receiving the first user request, the system may determine a first block size of a blockchain network for the first user request. The system may receive, via the user interface of the user device, a sixth user request to execute a fourth blockchain operation using the first cryptography-based, storage application. The system may, in response to receiving a fourth user request, determine a second block size of the blockchain network for the fourth user request. For example, limitations to block size may be enforced by a blockchain network based on a gas limit for a block, which may be enforced algorithmically. For example, as the size of a block exceeds 15 million, the base fee may increase proportionally, or if a block is smaller than 15 million, the base fee may decrease proportionally.

In some embodiments, the system may use combined logic pathways to process blockchain operations. For example, the system may determine that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. The system may, in response to determining that the first blockchain operation corresponds to the first blockchain operation type, process the first blockchain operation using a first logic pathway of a plurality of logic pathways for the first cryptography-based, storage application, wherein the plurality of logic pathways comprise respective logic pathways for processing blockchain operations having different blockchain operation types.

For example, the system may process blockchain operations with multiple operations types. For example, the first blockchain operation type may comprise a first format with a single value for a first blockchain operating requirement. The second blockchain operation type may comprise a second format with two values for the first blockchain operating requirement, wherein the two values comprise a first value corresponding to an upperbound of a total gas allotment and a second value corresponding to an upperbound of a gas allotment distributed to a validator of the first blockchain operation.

In some embodiments, the system may generate dynamic gas ranges. For example, the system may determine a first dynamic gas range for the first blockchain operation, wherein a lowerbound of the first dynamic gas range is based on a static blockchain operation characteristic (e.g., a priority designation) and a dynamic blockchain operation characteristic (e.g., a base fee). For example, a dynamic blockchain operation characteristic may be based on a current state of a blockchain network, and the first value for the first type of static blockchain operation characteristic may be based on a user input.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 10.

Figure 11:
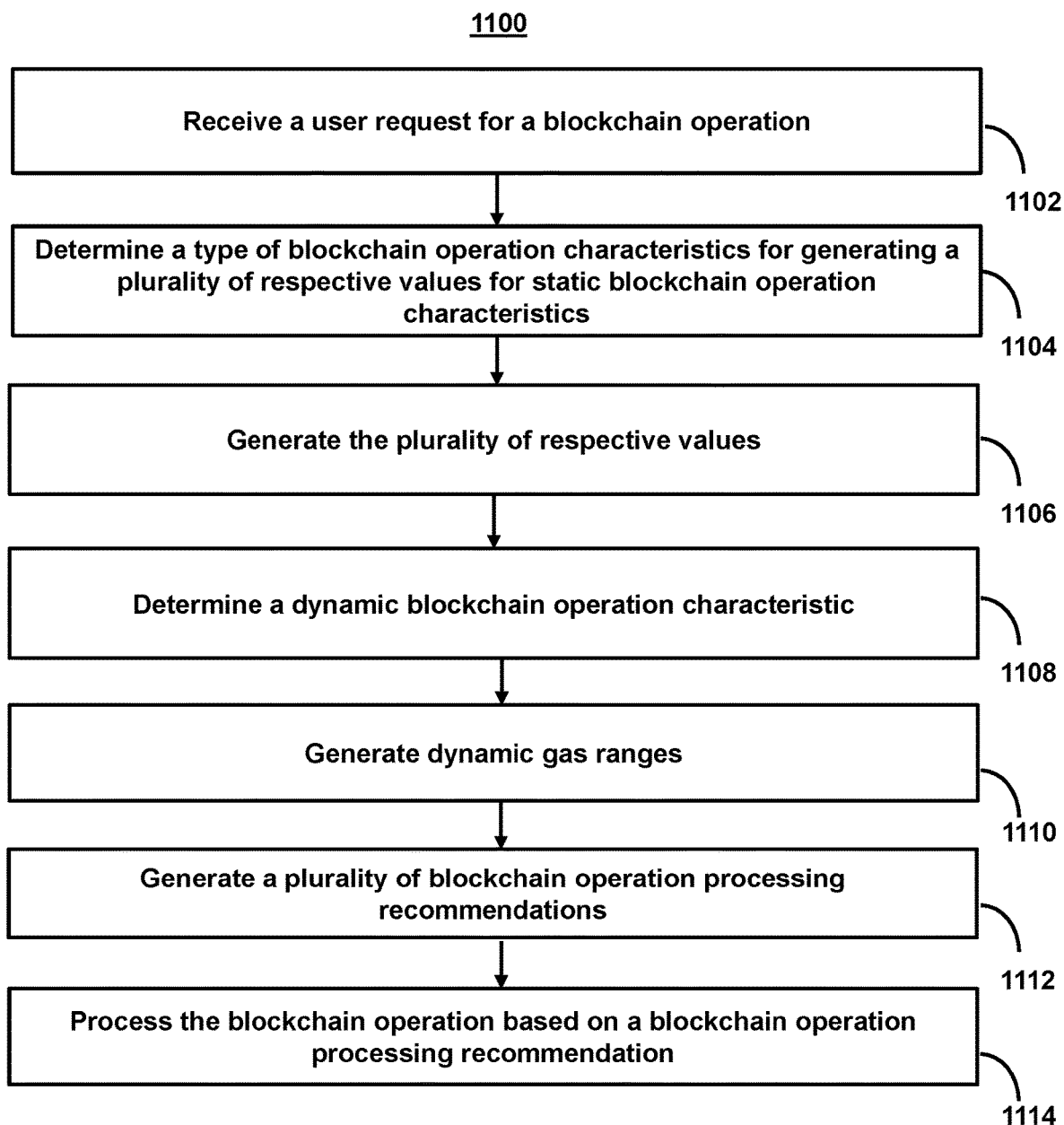
FIG. 11 shows a flowchart of the steps involved in facilitating blockchain operation characteristic selection when conducting blockchain operations, in accordance with one or more embodiments.

FIG. 11 shows a flowchart of the steps involved in facilitating blockchain operation characteristic selection when conducting blockchain operations, in accordance with one or more embodiments. For example, the system may use process 1100 (e.g., as implemented on one or more system components described above) in order to provide the features described in FIGS. 1A-F.

At step 1102, process 1100 (e.g., using one or more components described above) receives a user request for a blockchain operation. For example, the system may receive a first user request to perform a blockchain operation, of a plurality of blockchain operations, corresponding to a first cryptography-based, storage application. The first cryptography-based, storage application (e.g., digital wallet) may be linked to a user account.

For example, the system may access a user account corresponding to a public key in response to receiving the first user request, wherein the first cryptography-based, storage application that corresponds to the user account is accessible to a user device through a platform application, and wherein the first cryptography-based, storage application is used to perform the plurality of blockchain operations. The system may then retrieve, from the user account, a first partial private key and a user address. The system may query user device for use of a second partial private key in performing the blockchain operation. The system may generate a first digital signature based on the first partial private key and the second partial private key. The system may perform the blockchain operation based on the first digital signature and the user address.

At step 1104, process 1100 (e.g., using one or more components described above) determines a type of blockchain operation characteristics for generating a plurality of respective values for static blockchain operation characteristics. For example, the system may determine, based on a first function, a first type of blockchain operation characteristics of a plurality of blockchain operation characteristics for generating a plurality of respective values for static blockchain operation characteristics for a plurality of blockchain operation processing recommendations, wherein each of the plurality of blockchain operation processing recommendations corresponds to a respective dynamic gas range of a plurality of dynamic gas ranges.

In some embodiments, the system (e.g., an API) may use one or more functions to determine what type of blockchain operation characteristics to generate values for and/or what function to use to generate the values (or select the type). For example, the system may retrieve a user setting for a user account corresponding to the first cryptography-based, storage application. Based on the user setting, the system may select the first type of blockchain operation characteristics from the plurality of blockchain operation characteristics for generating the plurality of respective values for static blockchain operation characteristics. Alternatively or additionally, the system may retrieve a user setting for a user account corresponding to the first cryptography-based, storage application. Based on the user setting, the system may select the first function, of a plurality of functions, to determine a type of blockchain operation characteristics of the plurality of blockchain operation characteristics for generating the plurality of respective values for static blockchain operation characteristics.

At step 1106, process 1100 (e.g., using one or more components described above) generates the plurality of respective values. For example, the system may generate the plurality of respective values for the first type of blockchain operation characteristics. In some embodiments, the plurality of respective values for static blockchain operation characteristics correspond to a plurality of respective priority designations.

In some embodiments, the system may use preset values (e.g., in the API) to determine the respective values. In some embodiments, the system may retrieve historic blockchain operations and determine a value (or average value) corresponding to the completed blockchain operations. For example, the system may determine (e.g., with a given confidence) a value (e.g., a priority fee) corresponding to an average blockchain operation (e.g., over the past several blocks or time period) that was completed. The system may then use this value for the respective value and/or based the respective value off of these values. For example, the system may retrieve records for completed blockchain operations of a given time period. The system may determine values corresponding to the first type of blockchain operation characteristics for the records. The system may then determine the plurality of respective values for static blockchain operation characteristics for the plurality of blockchain operation processing recommendations based on the values corresponding to the first type of blockchain operation characteristics for the records.

At step 1108, process 1100 (e.g., using one or more components described above) determines a dynamic blockchain operation characteristic. For example, the system may determine a dynamic blockchain operation characteristic based on a current state of a blockchain network. For example, determining the dynamic blockchain operation characteristic based on the current state of the blockchain network may comprise the system receiving an indication of an amount of congestion on the blockchain network.

At step 1110, process 1100 (e.g., using one or more components described above) generates dynamic gas ranges. For example, the system may generate a first dynamic gas range of the plurality of dynamic gas ranges by combining the dynamic blockchain operation characteristic with a first value of the plurality of respective values for the first type of blockchain operation characteristics. The system may also generate a second dynamic gas range of the plurality of dynamic gas ranges by combining the dynamic blockchain operation characteristic with a second value of the plurality of respective values for the first type of blockchain operation characteristics.

The system may generate the dynamic gas ranges based on a median estimate and provide an upperbound and lowerbound based on a given confidence level. Alternatively or additionally, the system may generate a dynamic gas range by combining a dynamic blockchain operation characteristic with a first value of the plurality of respective values for the first type of blockchain operation characteristic. In such cases, the system may determine a range for the dynamic blockchain operation characteristic. The system may generate a lowerbound of the first dynamic gas range by summing the first value with a lowerbound of the range. The system may generate an upperbound of the first dynamic gas range by summing the first value with an upperbound of the range.

At step 1112, process 1100 (e.g., using one or more components described above) generates a plurality of blockchain operation processing recommendations. For example, the system may generate for display, on a user interface, a first blockchain operation processing recommendation, of the plurality of blockchain operation processing recommendations, based on the first dynamic gas range. The system may also (e.g., simultaneously) generate for display, on the user interface, a second blockchain operation processing recommendation, of the plurality of blockchain operation processing recommendations, based on the second dynamic gas range.

At step 1114, process 1100 (e.g., using one or more components described above) processes the blockchain operation based on a blockchain operation processing recommendation. For example, the system may receive a user input corresponding to the first blockchain operation processing recommendation. In response to the user input, the system may process the blockchain operation based on the first value.

In some embodiments, processing the blockchain operation may comprise selecting a logic pathway for the API. For example, the system may determine that the blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard. The system may, in response to determining that the blockchain operation corresponds to the first blockchain operation type, process the blockchain operation using a first logic pathway of a plurality of logic pathways for the first cryptography-based, storage application, wherein the plurality of logic pathways comprise respective logic pathways for processing blockchain operations having different blockchain operation types. For example, a first blockchain operation type may comprise a first format with a single value for a first blockchain operating requirement. A second blockchain operation type may comprise a second format with two values for the first blockchain operating requirement. The two values may comprise a value corresponding to an upperbound of a total gas allotment and a value corresponding to an upperbound of a gas allotment distributed to a validator of the blockchain operation.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a first user device, a first user request to execute a first blockchain operation using a first cryptography-based, storage application; in response to receiving the first user request, determining that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard; in response to determining that the first blockchain operation corresponds to the first blockchain operation type, processing the first blockchain operation using a first logic pathway of a plurality of logic pathways for the first cryptography-based, storage application, wherein the plurality of logic pathways comprises respective logic pathways for processing blockchain operations having different blockchain operation types; in response to processing the first blockchain operation using the first logic pathway, submitting the first blockchain operation to a blockchain network corresponding to the first blockchain operation; and in response to submitting the first blockchain operation to the blockchain network, processing the first blockchain operation using a combined logic pathway, wherein the combined logic pathway comprises a single logic pathway for processing blockchain operations having different blockchain operation types.

2. The method of embodiment 1, wherein the method is for processing blockchain operations featuring a plurality of blockchain operation types in cryptography-based, storage applications used for decentralized applications.

3. The method of any preceding embodiment, wherein the first logic pathway comprises a hierarchal set of interrelated functions performed by an application programming interface.

4. The method of any preceding embodiment, wherein the first logic pathway comprises a first logical component for creating the first blockchain operation based on the first user request, the first blockchain operation type, and a first standard for the blockchain network.

5. The method of any preceding embodiment, wherein the first logic pathway comprises a second logical component for digitally signing the first blockchain operation based on the first user request, the first blockchain operation type, and a first standard for the blockchain network.

6. The method of any preceding embodiment, wherein the combined logic pathway comprises a third logical component for recording the first blockchain operation in a blockchain indexing application that comprises a queryable record of a subset of blockchain operations occurring on the blockchain network.

7. The method of any preceding embodiment, wherein the first cryptography-based, storage application is used to perform a plurality of blockchain operations across a computer network based on a combined use of a first public key, a first partial private key, and a second partial private key, and wherein the second partial private key is not accessible to a platform service facilitating the first cryptography-based, storage application.

8. The method of any preceding embodiment, further comprising: receiving, at the first user device, a second user request to execute a second blockchain operation using the first cryptography-based, storage application; in response to receiving the second user request, determining that the second blockchain operation corresponds to a second blockchain operation type of the plurality of blockchain operation types; in response to determining that the second blockchain operation corresponds to the second blockchain operation type, processing the second blockchain operation using a second logic pathway of the plurality of logic pathways for the first cryptography-based, storage application; in response to processing the second blockchain operation using the second logic pathway, submitting the second blockchain operation to the blockchain network; and in response to submitting the second blockchain operation to the blockchain network, processing the second blockchain operation using the combined logic pathway.

9. The method of any preceding embodiment, wherein the first blockchain operation type comprises a first format with a single value for a first blockchain operating requirement, and wherein the second blockchain operation type comprises a second format with two values for the first blockchain operating requirement, wherein the two values comprise a first value corresponding to an upperbound of a total gas allotment and a second value corresponding to an upperbound of a gas allotment distributed to a validator of the first blockchain operation.

10. The method of any preceding embodiment, wherein processing the first blockchain operation comprises determining a first dynamic gas range for the blockchain operation, wherein a lowerbound of the first dynamic gas range is based on a static blockchain operation characteristic and a dynamic blockchain operation characteristic.

11. The method of any preceding embodiment, wherein processing the first blockchain operation comprises replacing a pending blockchain operation with the first blockchain operation.

12. A method, the method comprising: receiving, at a first user device, a first user request to execute a blockchain operation using a first cryptography-based, storage application; in response to receiving the first user request, determining a first static blockchain operation characteristic for the blockchain operation, wherein the first static blockchain operation characteristic is based on a first user input; determining a second static blockchain operation characteristic for the blockchain operation, wherein the second static blockchain operation characteristic is based on a second user input; determining a third static blockchain operation characteristic for the blockchain operation based on the second static blockchain operation characteristic; determining a second threshold criterion based on a sum of the third static blockchain operation characteristic and a first threshold criterion; comparing the first static blockchain operation characteristic to the second threshold criterion to determine whether the first static blockchain operation characteristic exceeds the second threshold criterion; and in response to determining that the first static blockchain operation characteristic exceeds the second threshold criterion, determining a first dynamic gas range for the blockchain operation, wherein a lowerbound of the first dynamic gas range is based on the second threshold criterion and a fourth dynamic blockchain operation characteristic, wherein the fourth dynamic blockchain operation characteristic is based on a current state of the blockchain network; and generating for display, in a user interface, the first dynamic gas range for the blockchain operation.

13. The method of any preceding embodiment, wherein determining the first static blockchain operation characteristic for the blockchain operation comprises determining a max fee.

14. The method of any preceding embodiment, wherein the first threshold criterion is the base fee.

15. The method of any preceding embodiment, wherein the second static blockchain operation characteristic is a priority designation.

16. The method of any preceding embodiment, wherein determining the third static blockchain operation characteristic for the blockchain operation comprises determining a max priority fee.

17. The method of any preceding embodiment, wherein the fourth dynamic blockchain operation characteristic is a gas limit.

18. The method of any preceding embodiment, wherein an upperbound of the first dynamic gas range is based on the first static blockchain operation characteristic and the fourth dynamic blockchain operation characteristic.

19. The method of any preceding embodiment, further comprising: in response to determining that the first static blockchain operation characteristic does not exceed the second threshold criterion, determining a static gas fee for the blockchain operation, wherein the static gas fee is based on the first static blockchain operation characteristic and the fourth dynamic blockchain operation characteristic.

20. The method of any preceding embodiment, further comprising: receiving, at the first user device, a second user request confirming execution of the blockchain operation; determining an actual gas fee for the blockchain operation; and conducting the blockchain operation with the actual gas fee using the first cryptography-based, storage application.

21. The method of any preceding embodiment, further comprising: determining that the blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard; and in response to determining that the blockchain operation corresponds to the first blockchain operation type, determining a static gas fee for the blockchain operation based on the first static blockchain operation characteristic.

22. A method, the method comprising: receiving, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic; while the first blockchain operation is pending, receiving, via the user interface of the user device, a second user request to modify the first blockchain operation; in response to the second user request, determining a first nonce value for the first blockchain operation; identifying the first blockchain operation from a plurality of pending blockchain operations based on the first nonce value; in response to identifying the first blockchain operation, determining a first modification type of a plurality of modification types for the first blockchain operation; selecting the first type of static blockchain operation characteristic for modification based on the first modification type; determining a third value for the first type of static blockchain operation characteristic; generating a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation; and in response to generating the second blockchain operation, automatically, without further user input, cause replacement of the first blockchain operation with the second blockchain operation in the plurality of pending blockchain operations.

23. The method of any preceding embodiment, further comprising: while the second blockchain operation is pending, receiving, via the user interface of the user device, a third user request to modify the second blockchain operation; in response to the third user request, determining a second nonce value for the second blockchain operation; identifying the second blockchain operation from the plurality of pending blockchain operations based on the second nonce value; in response to identifying the second blockchain operation, determining the first modification type of the plurality of modification types for the second blockchain operation; selecting the first type of static blockchain operation characteristic for modification based on the first modification type; determining a fourth value for the first type of static blockchain operation characteristic; generating a third blockchain operation using the first cryptography-based, storage application, wherein the third blockchain operation comprises the fourth value for the first type of static blockchain operation characteristic and the second value for the second type of static blockchain operation characteristic, and wherein a second set of additional values for additional types of static blockchain operation characteristics are automatically populated based on the second blockchain operation; and in response to generating the third blockchain operation, automatically, without further user input, cause replacement of the second blockchain operation with the third blockchain operation in the plurality of pending blockchain operations.

24. The method of any preceding embodiment, wherein having the fourth value for the first type of static blockchain operation characteristic cause the third blockchain operation to have a higher priority than the second blockchain operation.

25. The method of any preceding embodiment, further comprising: while the second blockchain operation is pending, receiving, via the user interface of the user device, a fourth user request to modify the second blockchain operation; in response to the fourth user request, determining a second nonce value for the second blockchain operation; identifying the second blockchain operation from the plurality of pending blockchain operations based on the second nonce value; in response to identifying the second blockchain operation, determining a second modification type of the plurality of modification types for the second blockchain operation; selecting the second type of static blockchain operation characteristic for modification based on the second modification type; determining a fourth value for the first type of static blockchain operation characteristic; generating a second blockchain operation using the first cryptography-based, storage application, wherein the second blockchain operation comprises the third value for the first type of static blockchain operation characteristic and the fourth value for the second type of static blockchain operation characteristic, and wherein a second set of additional values for additional types of static blockchain operation characteristics are automatically populated based on the second blockchain operation; and in response to generating the second blockchain operation, automatically, without further user input, cause replacement of the first blockchain operation with the second blockchain operation in the plurality of pending blockchain operations and canceling the second blockchain operation in the plurality of pending blockchain operations.

26. The method of any preceding embodiment, further comprising: in response to receiving the first user request, determining a first block size of a blockchain network for the first user request; receiving, via the user interface of the user device, a sixth user request to execute a fourth blockchain operation using the first cryptography-based, storage application; and in response to receiving a fourth user request, determining a second block size of the blockchain network for the fourth user request.

27. The method of any preceding embodiment, further comprising: determining that the first blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard; and in response to determining that the first blockchain operation corresponds to the first blockchain operation type, processing the first blockchain operation using a first logic pathway of a plurality of logic pathways for the first cryptography-based, storage application, wherein the plurality of logic pathways comprise respective logic pathways for processing blockchain operations having different blockchain operation types.

28. The method of any preceding embodiment, wherein the first blockchain operation type comprises a first format with a single value for a first blockchain operating requirement, and wherein the second blockchain operation type comprises a second format with two values for the first blockchain operating requirement, wherein the two values comprise a first value corresponding to an upperbound of a total gas allotment and a second value corresponding to an upperbound of a gas allotment distributed to a validator of the first blockchain operation.

29. The method of any preceding embodiment, further comprising: determining a first dynamic gas range for the first blockchain operation, wherein a lowerbound of the first dynamic gas range is based on a static blockchain operation characteristic and a dynamic blockchain operation characteristic.

30. The method of any preceding embodiment, wherein the first cryptography-based, storage application is used to perform a plurality of blockchain operations across a computer network based on a combined use of a first public key, a first partial private key, and a second partial private key, and wherein the second partial private key is not accessible to a platform service facilitating the first cryptography-based, storage application.

31. The method of any preceding embodiment, wherein the first blockchain operation comprises a dynamic blockchain operation characteristic that is based on a current state of a blockchain network, and wherein the first value for the first type of static blockchain operation characteristic is based on a user input.

32. A method, the method comprising: receiving a first user request to perform a blockchain operation, of plurality of blockchain operations, corresponding to a first cryptography-based, storage application; determining, based on a first function, a first type of blockchain operation characteristics of a plurality of blockchain operation characteristics for generating a plurality of respective values for static blockchain operation characteristics for a plurality of blockchain operation processing recommendations, wherein each of the plurality of blockchain operation processing recommendations corresponds to a respective dynamic gas range of a plurality of dynamic gas ranges; generating the plurality of respective values for the first type of blockchain operation characteristics; determining a dynamic blockchain operation characteristic based on a current state of a blockchain network; generating a first dynamic gas range of the plurality of dynamic gas ranges by combining the dynamic blockchain operation characteristic with a first value of the plurality of respective values for the first type of blockchain operation characteristics; generating a second dynamic gas range of the plurality of dynamic gas ranges by combining the dynamic blockchain operation characteristic with a second value of the plurality of respective values for the first type of blockchain operation characteristics; generating for display, on a user interface, a first blockchain operation processing recommendation, of the plurality of blockchain operation processing recommendations, based on the first dynamic gas range; generating for display, on the user interface, a second blockchain operation processing recommendation, of the plurality of blockchain operation processing recommendations, based on the second dynamic gas range; receiving a user input corresponding to the first blockchain operation processing recommendation; and in response to the user input, processing the blockchain operation based on the first value.

33. The method of any preceding embodiment, wherein the plurality of respective values for static blockchain operation characteristics correspond to a plurality of respective priority designations.

34. The method of any preceding embodiment, wherein determining the dynamic blockchain operation characteristic based on the current state of the blockchain network comprises receiving an indication of an amount of congestion on the blockchain network.

35. The method of any preceding embodiment, wherein generating the first dynamic gas range of the plurality of dynamic gas ranges by combining the dynamic blockchain operation characteristic with the first value of the plurality of respective values for the first type of blockchain operation characteristics comprises: determining a range for the dynamic blockchain operation characteristic; generating a lowerbound of the first dynamic gas range by summing the first value with a lowerbound of the range; and generating an upperbound of the first dynamic gas range by summing the first value with an upperbound of the range.

36. The method of any preceding embodiment, further comprising: accessing a user account corresponding to a public key in response to receiving the first user request, wherein the first cryptography-based, storage application corresponds to the user account is accessible to a user device through a platform application, and wherein the first cryptography-based, storage application is used to perform the plurality of blockchain operations; retrieving, from the user account, a first partial private key and a user address; querying user device for use of a second partial private key in performing the blockchain operation; generating a first digital signature based on the first partial private key and the second partial private key; and performing the blockchain operation based on the first digital signature and the user address.

37. The method of any preceding embodiment, wherein determining, based on the first function, the first type of blockchain operation characteristics of the plurality of blockchain operation characteristics for generating a plurality of respective values for static blockchain operation characteristics for the plurality of blockchain operation processing recommendations further comprises: retrieving a user setting for a user account corresponding to the first cryptography-based, storage application; and based on the user setting, selecting the first type of blockchain operation characteristics from the plurality of blockchain operation characteristics for generating the plurality of respective values for static blockchain operation characteristics.

38. The method of any preceding embodiment, further comprising: retrieving a user setting for a user account corresponding to the first cryptography-based, storage application; and based on the user setting, selecting the first function, of a plurality of functions, to determine a type of blockchain operation characteristics of the plurality of blockchain operation characteristics for generating the plurality of respective values for static blockchain operation characteristics.

39. The method of any preceding embodiment, further comprising: determining that the blockchain operation corresponds to a first blockchain operation type of a plurality of blockchain operation types, wherein the first blockchain operation type comprises a first envelope standard, and wherein the plurality of blockchain operation types comprise a second blockchain operation type that does not comprise the first envelope standard; and in response to determining that the blockchain operation corresponds to the first blockchain operation type, processing the blockchain operation using a first logic pathway of a plurality of logic pathways for the first cryptography-based, storage application, wherein the plurality of logic pathways comprise respective logic pathways for processing blockchain operations having different blockchain operation types.

40. The method of any preceding embodiment, wherein the first blockchain operation type comprises a first format with a single value for a first blockchain operating requirement, wherein the second blockchain operation type comprises a second format with two values for the first blockchain operating requirement, and wherein the two values comprise a value corresponding to an upper bound of a total gas allotment and a value corresponding to an upper bound of a gas allotment distributed to a validator of the blockchain operation.

41. The method of any preceding embodiment, further comprising: retrieving records for completed blockchain operations of a given time period; determining values corresponding to the first type of blockchain operation characteristics for the records; and determining the plurality of respective values for static blockchain operation characteristics for the plurality of blockchain operation processing recommendations based on the values corresponding to the first type of blockchain operation characteristics for the records.

42. A tangible, non-transitory, machine-readable medium storing instructions that, when executed by a data processing apparatus, cause the data processing apparatus to perform operations comprising any preceding embodiment.

43. A system comprising one or more processors; and memory storing instructions that, when executed by the processors, cause the processors to effectuate operations comprising any preceding embodiment.

44. A system comprising means for performing of any preceding embodiment.

What is claimed is:

1. A system for processing blockchain operations featuring a plurality of blockchain operation types in cryptography-based, storage applications used for decentralized applications, the system comprising:
   a first cryptography-based, storage application, wherein the first cryptography-based, storage application corresponds to a first private key, and wherein the first private key is stored on a user device;
   a second cryptography-based, storage application, wherein the second cryptography-based, storage application corresponds to a first partial private key and a second partial private key, wherein the first partial private key is stored on a remote device network, and wherein the second partial private key is stored on the user device;
   a blockchain node, wherein the blockchain node verifies batches of blockchain operations, and wherein each batch of the batches comprises a plurality of blockchain operations involving the first cryptography-based, storage application and the second cryptography-based, storage application; and
   a cryptography-based, indexing application, wherein the cryptography-based, indexing application comprises a queryable record of a subset of blockchain operations occurring on a blockchain network; and
   wherein the first cryptography-based, storage application is configured to:
      receive, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic;
      while the first blockchain operation is pending, receive, via the user interface of the user device, a second user request to modify the first blockchain operation;
      in response to the second user request, determine a first nonce value for the first blockchain operation;
      identify the first blockchain operation from a plurality of pending blockchain operations based on the first nonce value;
      determine a first modification type of a plurality of modification types for the first blockchain operation;
      select the first type of static blockchain operation characteristic for modification based on the first modification type;
      determine a third value for the first type of static blockchain operation characteristic;
      generate a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation; and
      in response to generating the second blockchain operation, automatically, without further user input, cause replacement of the first blockchain operation with the second blockchain operation in the plurality of pending blockchain operations.

2. A method for modifying pending blockchain operations by mimicking the pending blockchain operations in decentralized applications, the method comprising:
   receiving, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic;
   while the first blockchain operation is pending, receiving, via the user interface of the user device, a second user request to modify the first blockchain operation;
   in response to the second user request, determining a first nonce value for the first blockchain operation;
   identifying the first blockchain operation from a plurality of pending blockchain operations based on the first nonce value;
   determining a first modification type of a plurality of modification types for the first blockchain operation;

selecting the first type of static blockchain operation characteristic for modification based on the first modification type;
determining a third value for the first type of static blockchain operation characteristic;
generating a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation; and
in response to generating the second blockchain operation, automatically, without further user input, cause replacement of the first blockchain operation with the second blockchain operation in the plurality of pending blockchain operations.

3. The method of claim 2, further comprising:
while the second blockchain operation is pending, receiving, via the user interface of the user device, a third user request to modify the second blockchain operation;
in response to the third user request, determining a second nonce value for the second blockchain operation;
identifying the second blockchain operation from the plurality of pending blockchain operations based on the second nonce value;
in response to identifying the second blockchain operation, determining the first modification type of the plurality of modification types for the second blockchain operation;
selecting the first type of static blockchain operation characteristic for modification based on the first modification type;
determining a fourth value for the first type of static blockchain operation characteristic;
generating a third blockchain operation using the first cryptography-based, storage application, wherein the third blockchain operation comprises the fourth value for the first type of static blockchain operation characteristic and the second value for the second type of static blockchain operation characteristic, and wherein a second set of additional values for additional types of static blockchain operation characteristics are automatically populated based on the second blockchain operation; and
in response to generating the third blockchain operation, automatically, without further user input, cause replacement of the second blockchain operation with the third blockchain operation in the plurality of pending blockchain operations.

4. The method of claim 3, wherein having the fourth value for the first type of static blockchain operation characteristic cause the third blockchain operation to have a higher priority than the second blockchain operation.

5. The method of claim 2, further comprising:
while the second blockchain operation is pending, receiving, via the user interface of the user device, a fourth user request to modify the second blockchain operation;
in response to the fourth user request, determining a second nonce value for the second blockchain operation;
identifying the second blockchain operation from the plurality of pending blockchain operations based on the second nonce value;
in response to identifying the second blockchain operation, determining a second modification type of the plurality of modification types for the second blockchain operation;
selecting the second type of static blockchain operation characteristic for modification based on the second modification type;
determining a fourth value for the first type of static blockchain operation characteristic;
generating a second blockchain operation using the first cryptography-based, storage application, wherein the second blockchain operation comprises the third value for the first type of static blockchain operation characteristic and the fourth value for the second type of static blockchain operation characteristic, and wherein a second set of additional values for additional types of static blockchain operation characteristics are automatically populated based on the second blockchain operation; and
in response to generating the second blockchain operation, automatically, without further user input, cause replacement of the first blockchain operation with the second blockchain operation in the plurality of pending blockchain operations and canceling the second blockchain operation in the plurality of pending blockchain operations.

6. The method of claim 2, further comprising:
in response to receiving the first user request, determining a first block size of a blockchain network for the first user request;
receiving, via the user interface of the user device, a sixth user request to execute a fourth blockchain operation using the first cryptography-based, storage application; and
in response to receiving a fourth user request, determining a second block size of the blockchain network for the fourth user request.

7. The method of claim 2, further comprising:
determining that the first blockchain operation corresponds to a first blockchain operation type of a plurality of blockchain operations types, wherein the plurality of blockchain operation types comprise respective operation envelope standards for blockchain operations; and
in response to determining that the first blockchain operation corresponds to the first blockchain operation type, processing the first blockchain operation using a first logic pathway of a plurality of logic pathways for the first cryptography-based, storage application, wherein the plurality of logic pathways comprise respective logic pathways for processing blockchain operations having different envelope standards.

8. The method of claim 7, wherein the first blockchain operation type comprises a first format with a single value for a first blockchain operating requirement, wherein the second blockchain operation type comprises a second format with two values for the first blockchain operating requirement, and wherein the two values comprise a first value corresponding to an upper bound of a total gas allotment and a second value corresponding to an upper bound of a gas allotment distributed to a validator of the first blockchain operation.

9. The method of claim 2, further comprising:
determining a first dynamic gas range for the first blockchain operation, wherein a lowerbound of the first dynamic gas range is based on a static blockchain operation characteristic and a dynamic blockchain operation characteristic.

10. The method of claim 2, wherein the first cryptography-based, storage application is used to perform a plurality of blockchain operations across a computer network based on a combined use of a first public key, a first partial private key, and a second partial private key, and wherein the second partial private key is not accessible to a platform service facilitating the first cryptography-based, storage application.

11. The method of claim 2, wherein the first blockchain operation comprises a dynamic blockchain operation characteristic that is based on a current state of a blockchain network, and wherein the first value for the first type of static blockchain operation characteristic is based on a user input.

12. A non-transitory computer readable medium comprising instructions recorded thereon that when executed by one or more processors causes operations comprising:
    receiving, via a user interface of a user device, a first user request to execute a first blockchain operation using a first cryptography-based, storage application, wherein the first blockchain operation comprises a first value for a first type of static blockchain operation characteristic and a second value for a second type of static blockchain operation characteristic;
    while the first blockchain operation is pending, receiving, via the user interface of the user device, a second user request to modify the first blockchain operation;
    in response to the second user request, determining a first nonce value for the first blockchain operation;
    identifying the first blockchain operation from a plurality of pending blockchain operations based on the first nonce value;
    determining a first modification type of a plurality of modification types for the first blockchain operation;
    selecting the first type of static blockchain operation characteristic for modification based on the first modification type;
    determining a third value for the first type of static blockchain operation characteristic;
    generating a second blockchain operation using the first cryptography-based, storage application, wherein the second blockchain operation comprises the third value for the first type of static blockchain operation characteristic and the second value for the second type of static blockchain operation characteristic, and wherein a first set of additional values for additional types of static blockchain operation characteristics are automatically populated based on the first blockchain operation; and
    in response to generating the second blockchain operation, automatically, without further user input, cause replacement of the first blockchain operation with the second blockchain operation in the plurality of pending blockchain operations.

13. The non-transitory computer readable medium of claim 12, wherein the instructions further cause operations comprising:
    while the second blockchain operation is pending, receiving, via the user interface of the user device, a third user request to modify the second blockchain operation;
    in response to the third user request, determining a second nonce value for the second blockchain operation;
    identifying the second blockchain operation from the plurality of pending blockchain operations based on the second nonce value;
    determining the first modification type of the plurality of modification types for the second blockchain operation;
    selecting the first type of static blockchain operation characteristic for modification based on the first modification type;
    determining a fourth value for the first type of static blockchain operation characteristic;
    generating a third blockchain operation using the first cryptography-based, storage application, wherein the third blockchain operation comprises the fourth value for the first type of static blockchain operation characteristic and the second value for the second type of static blockchain operation characteristic, and wherein a second set of additional values for additional types of static blockchain operation characteristics are automatically populated based on the second blockchain operation; and
    in response to generating the third blockchain operation, automatically, without further user input, cause replacement of the second blockchain operation with the third blockchain operation in the plurality of pending blockchain operations.

14. The non-transitory computer readable medium of claim 13, wherein having the fourth value for the first type of static blockchain operation characteristic cause the third blockchain operation to have a higher priority than the second blockchain operation.

15. The non-transitory computer readable medium of claim 12, wherein the instructions further cause operations comprising:
    while the second blockchain operation is pending, receiving, via the user interface of the user device, a fourth user request to modify the second blockchain operation;
    in response to the fourth user request, determining a second nonce value for the second blockchain operation;
    identifying the second blockchain operation from the plurality of pending blockchain operations based on the second nonce value;
    in response to identifying the second blockchain operation, determining a second modification type of the plurality of modification types for the second blockchain operation;
    selecting the second type of static blockchain operation characteristic for modification based on the second modification type;
    determining a fourth value for the first type of static blockchain operation characteristic;
    generating a second blockchain operation using the first cryptography-based, storage application, wherein the second blockchain operation comprises the third value for the first type of static blockchain operation characteristic and the fourth value for the second type of static blockchain operation characteristic, and wherein a second set of additional values for additional types of static blockchain operation characteristics are automatically populated based on the second blockchain operation; and
    in response to generating the second blockchain operation, automatically, without further user input, cause replacement of the first blockchain operation with the second blockchain operation in the plurality of pending blockchain operations and canceling the second blockchain operation in the plurality of pending blockchain operations.

16. The non-transitory computer readable medium of claim 12, wherein the instructions further cause operations comprising:

in response to receiving the first user request, determining a first block size of a blockchain network for the first user request;

receiving, via the user interface of the user device, a sixth user request to execute a fourth blockchain operation using the first cryptography-based, storage application; and in response to receiving a fourth user request, determining a second block size of the blockchain network for the fourth user request.

17. The non-transitory computer readable medium of claim 12, wherein the instructions further cause operations comprising:

determining that the first blockchain operation corresponds to a first blockchain operation type of a plurality of blockchain operations types, wherein the plurality of blockchain operation types comprise respective operation envelope standards for blockchain operations; and in response to determining that the first blockchain operation corresponds to the first blockchain operation type, processing the first blockchain operation using a first logic pathway of a plurality of logic pathways for the first cryptography-based, storage application, wherein the plurality of logic pathways comprise respective logic pathways for processing blockchain operations having different envelope standards.

18. The non-transitory computer readable medium of claim 17, wherein the first blockchain operation type comprises a first format with a single value for a first blockchain operating requirement, and wherein the second blockchain operation type comprises a second format with two values for the first blockchain operating requirement, wherein the two values comprise a first value corresponding to an upper bound of a total gas allotment and a second value corresponding to an upper bound of a gas allotment distributed to a validator of the first blockchain operation.

19. The non-transitory computer readable medium of claim 12, wherein the instructions further cause operations comprising:

determining a first dynamic gas range for the first blockchain operation, wherein a lowerbound of the first dynamic gas range is based on a static blockchain operation characteristic and a dynamic blockchain operation characteristic.

20. The non-transitory computer readable medium of claim 12, wherein the first blockchain operation comprises a dynamic blockchain operation characteristic that is based on a current state of a blockchain network, and wherein the first value for the first type of static blockchain operation characteristic is based on a user input.

* * * * *